US012202266B2

(12) United States Patent
Aimono et al.

(10) Patent No.: US 12,202,266 B2
(45) Date of Patent: Jan. 21, 2025

(54) LIQUID EJECTING HEAD AND LIQUID EJECTING APPARATUS

(71) Applicant: SEIKO EPSON CORPORATION, Tokyo (JP)

(72) Inventors: Takanori Aimono, Matsumoto (JP); Yuma Fukuzawa, Matsumoto (JP); Shohei Mizuta, Matsumoto (JP); Shotaro Tamai, Matsumoto (JP); Shun Katsuie, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 168 days.

(21) Appl. No.: 18/164,231

(22) Filed: Feb. 3, 2023

(65) Prior Publication Data

US 2023/0249459 A1 Aug. 10, 2023

(30) Foreign Application Priority Data

Feb. 4, 2022 (JP) ................................ 2022-016088

(51) Int. Cl.
*B41J 2/14* (2006.01)

(52) U.S. Cl.
CPC .. *B41J 2/14201* (2013.01); *B41J 2002/14467* (2013.01)

(58) Field of Classification Search
CPC .......... B41J 2/14201; B41J 2002/14467; B41J 2202/11; B41J 2202/12; B41J 2/14233; B41J 2/04581; B41J 2002/14338; B41J 2002/14419
See application file for complete search history.

(56) References Cited

U.S. PATENT DOCUMENTS

2019/0283421 A1* 9/2019 Miyazawa ........... B41J 2/14233

FOREIGN PATENT DOCUMENTS

JP 2019-155768 A 9/2019

* cited by examiner

*Primary Examiner* — Lisa Solomon
(74) *Attorney, Agent, or Firm* — WORKMAN NYDEGGER

(57) ABSTRACT

A liquid ejecting head includes: a nozzle; first to fourth pressure chambers; a communication flow path coupled to the nozzle and communicating between the nozzle and the first to fourth pressure chambers; first to fourth flow paths coupling the communication flow path and the first to fourth pressure chambers; a first-common-liquid-chamber communicating with the first-pressure-chamber and the second-pressure-chamber; and a second-common-liquid-chamber communicating with the third-pressure-chamber and the fourth-pressure-chamber. The first-flow-path and the second-flow-path are arranged side by side in a first-direction, the third-flow-path and the fourth-flow-path are arranged side by side in the first-direction, and the first-flow-path and the second-flow-path, and the third-flow-path and the fourth-flow-path are arranged to be shifted in a second-direction orthogonal to the first-direction. The first-flow-path is shifted from each of the third-flow-path and the fourth-flow-path in the first-direction, and the second-flow-path is shifted from each of the third-flow-path and the fourth-flow-path in the first-direction.

17 Claims, 14 Drawing Sheets

LIQUID EJECTING HEAD AND LIQUID EJECTING APPARATUS

The present application is based on, and claims priority from JP Application Serial Number 2022-016088, filed Feb. 4, 2022, the disclosure of which is hereby incorporated by reference herein in its entirety.

BACKGROUND

1. Technical Field

The present disclosure relates to a liquid ejecting head and a liquid ejecting apparatus.

2. Related Art

JP-A-2019-155768 discloses a liquid ejecting head in which four pressure chambers are provided on both sides of a nozzle, and flow paths from each of the four pressure chambers to the nozzle are joined near the nozzle.

However, in the above-described technology of the related art, a considerable amount of space is provided in the flow path forming member in order to form the four flow paths from each of the four pressure chambers to the nozzle, and there is a concern that the strength and rigidity of the flow path forming member excessively decrease.

SUMMARY

According to an aspect of the present disclosure, there is provided a liquid ejecting head including: a nozzle for ejecting a liquid; first to fourth pressure chambers; a communication flow path coupled to the nozzle and communicating between the nozzle and the first to fourth pressure chambers; a first flow path coupling the communication flow path and the first pressure chamber; a second flow path coupling the communication flow path and the second pressure chamber; a third flow path coupling the communication flow path and the third pressure chamber; a fourth flow path coupling the communication flow path and the fourth pressure chamber; a first driving element that changes a pressure in the first pressure chamber; a second driving element that changes a pressure in the second pressure chamber; a third driving element that changes a pressure in the third pressure chamber; a fourth driving element that changes a pressure in the fourth pressure chamber; a first common liquid chamber communicating with the first pressure chamber and the second pressure chamber; and a second common liquid chamber communicating with the third pressure chamber and the fourth pressure chamber. The first flow path and the second flow path are arranged side by side in a first direction, the third flow path and the fourth flow path are arranged side by side in the first direction, and the first flow path and the second flow path, and the third flow path and the fourth flow path are arranged to be shifted in a second direction orthogonal to the first direction. The first flow path is shifted from each of the third flow path and the fourth flow path in the first direction, and the second flow path is shifted from each of the third flow path and the fourth flow path in the first direction.

DESCRIPTION OF EXEMPLARY EMBODIMENTS

A. First Embodiment

Figure 1:
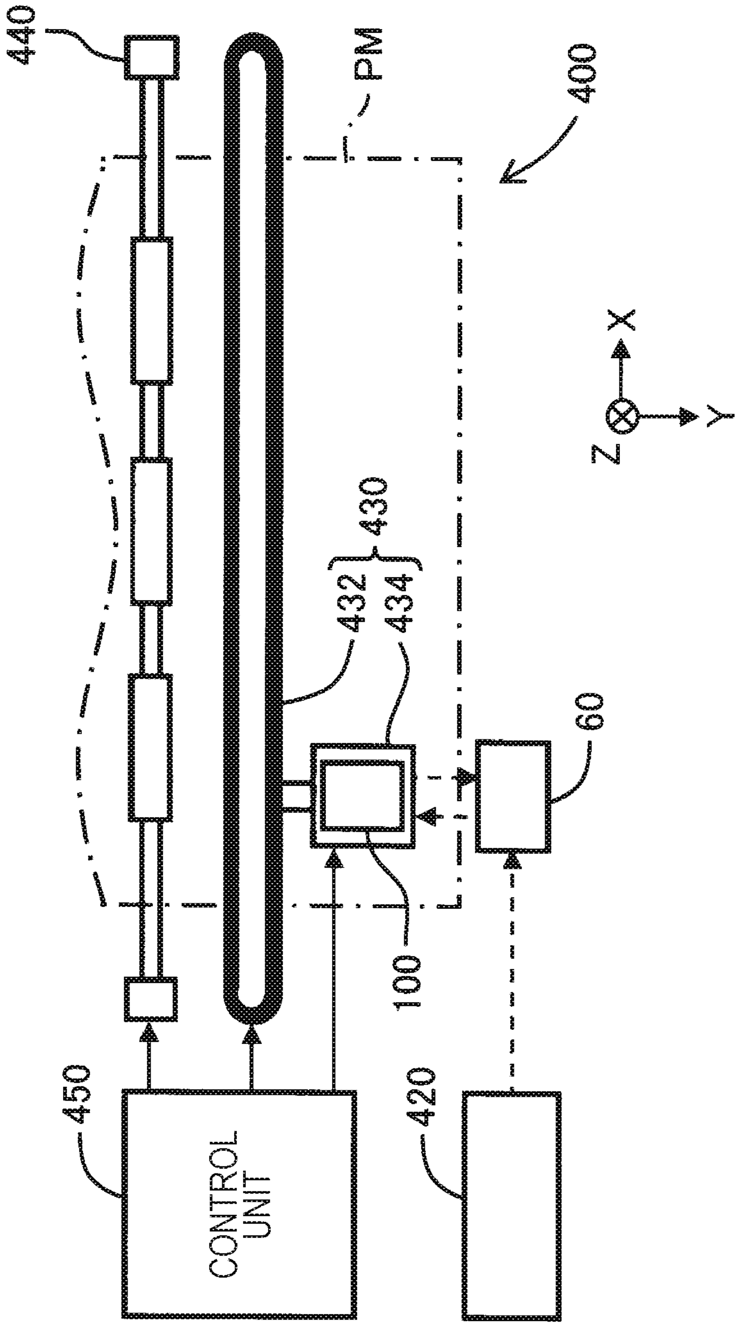
FIG. 1 is an explanatory view illustrating a configuration of a liquid ejecting apparatus according to an embodiment.

FIG. 1 is an explanatory view illustrating a configuration of a liquid ejecting apparatus 400 according to an embodiment. The liquid ejecting apparatus 400 is an ink jet type printing apparatus that ejects ink, which is an example of a liquid, onto a medium PM. The composition of the ink is not particularly limited. For example, the ink may be a water-based ink in which a coloring material such as a dye or pigment is dissolved in a water-based solvent, a solvent-based ink in which a coloring material is dissolved in an organic solvent, or an ultraviolet curable type ink. In addition, the liquid ejecting apparatus 400 may eject paint as a liquid instead of ink. A liquid storage section 420 for storing ink can be attached to the liquid ejecting apparatus 400. The liquid ejecting apparatus 400 executes printing by ejecting the ink in the liquid storage section 420 toward the medium PM. The liquid ejecting apparatus 400 includes a liquid ejecting head 100, a moving mechanism 430, a transport mechanism 440, a control unit 450, and a circulation mechanism 60.

The liquid ejecting head 100 includes a plurality of nozzles 200 and ejects liquid ink supplied from the liquid storage section 420 from the plurality of nozzles 200. Specific examples of the liquid storage section 420 include a container such as a cartridge that is attachable to and detachable from the liquid ejecting apparatus 400, a bag-shaped ink pack formed of a flexible film, and an ink tank that can be refilled with ink. Ink ejected from the nozzle 200 lands on the medium PM. The medium PM is typically a printing paper sheet. The medium PM is not limited to a printing paper sheet, and may be, for example, a printing target of any material such as a resin film or cloth.

The moving mechanism 430 includes a ring-shaped belt 432 and a carriage 434 fixed to the belt 432. The carriage 434 holds the liquid ejecting head 100. The moving mechanism 430 can reciprocate the liquid ejecting head 100 along the X direction by rotating the ring-shaped belt 432 in both directions.

The transport mechanism 440 transports the medium PM along the Y direction between movements of the liquid ejecting head 100 by the moving mechanism 430. The Y direction is a direction orthogonal to the X direction. In this embodiment, the X direction and the Y direction are horizontal directions. The Z direction is a direction intersecting the X direction and the Y direction. In this embodiment, the Z direction is vertically downward. The liquid ejecting head 100 ejects ink along the Z direction while being transported along the X direction. The Z direction is also referred to as "ejection direction Z". In the following description, the tip end side of the arrow indicating the X direction in the drawing is referred to as the +X side, and the base end side is referred to as the −X side. The tip end side of the arrow indicating the Y direction in the drawing is referred to as the +Y side, and the base end side is referred to as the −Y side. The tip end side of the arrow indicating the Z direction in the drawing is referred to as the +Z side, and the base end side is referred to as the −Z side.

The control unit 450 controls the operation of ejecting ink from the liquid ejecting head 100. The control unit 450 controls the transport mechanism 440, the moving mechanism 430, and the liquid ejecting head 100 to form an image on the medium PM.

Figure 2:
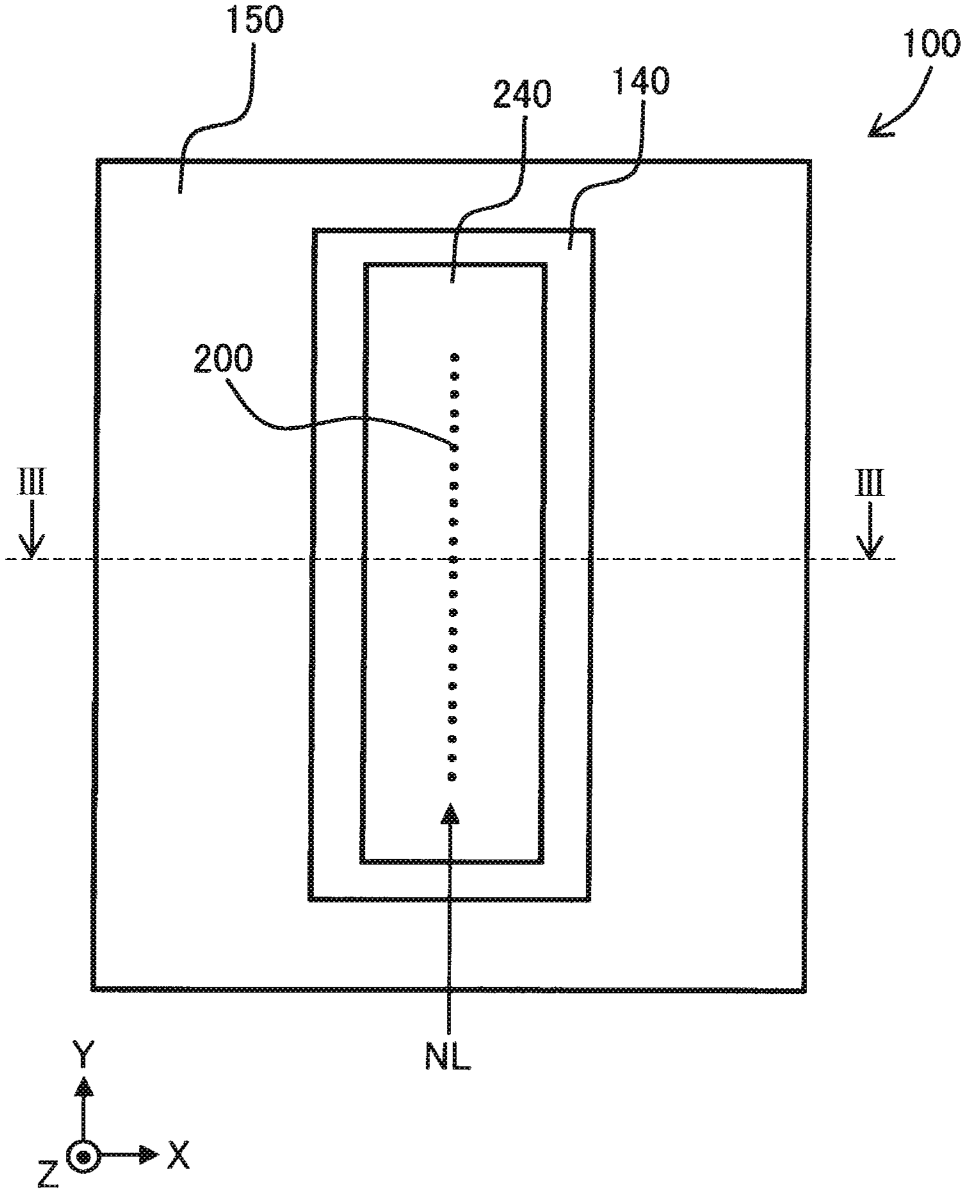
FIG. 2 is a bottom view of a liquid ejecting head.

FIG. 2 is a bottom view of the liquid ejecting head 100. The liquid ejecting head 100 includes the plurality of nozzles 200. The plurality of nozzles 200 are formed to penetrate a nozzle plate 240 disposed parallel to the XY plane. The plurality of nozzles 200 constitute a nozzle array NL by being linearly arranged along the Y direction. The nozzle plate 240 is manufactured, for example, by processing a silicon single crystal substrate using semiconductor processing technology. As the silicon single crystal substrate, for example, a (100) silicon single crystal substrate is preferably used. Note that the nozzle plate 240 may be made of a material such as stainless steel (SUS) or titanium.

Figure 3:
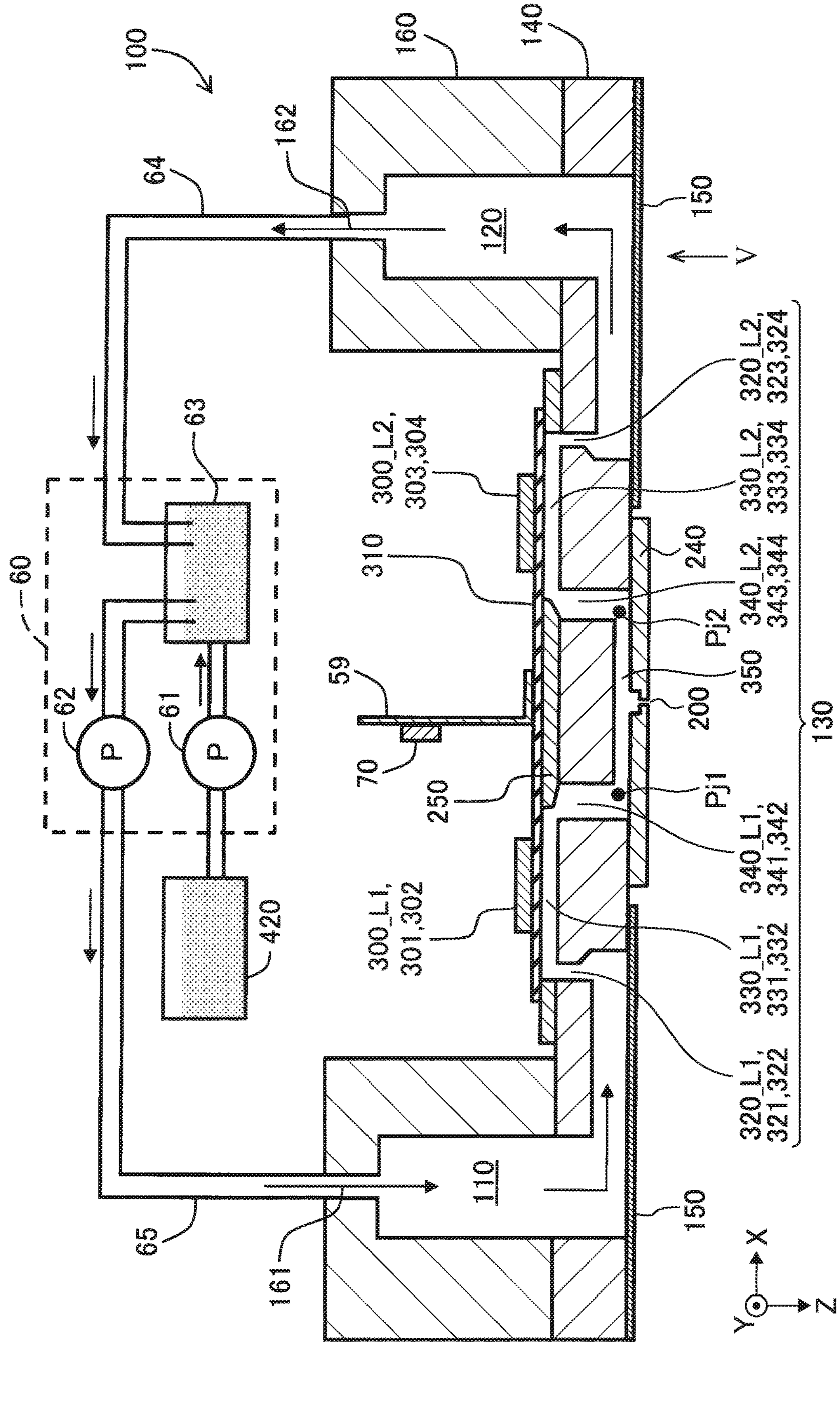
FIG. 3 is a cross-sectional view illustrating a cross section taken along the line III-III of FIG. 2.
Figure 4:
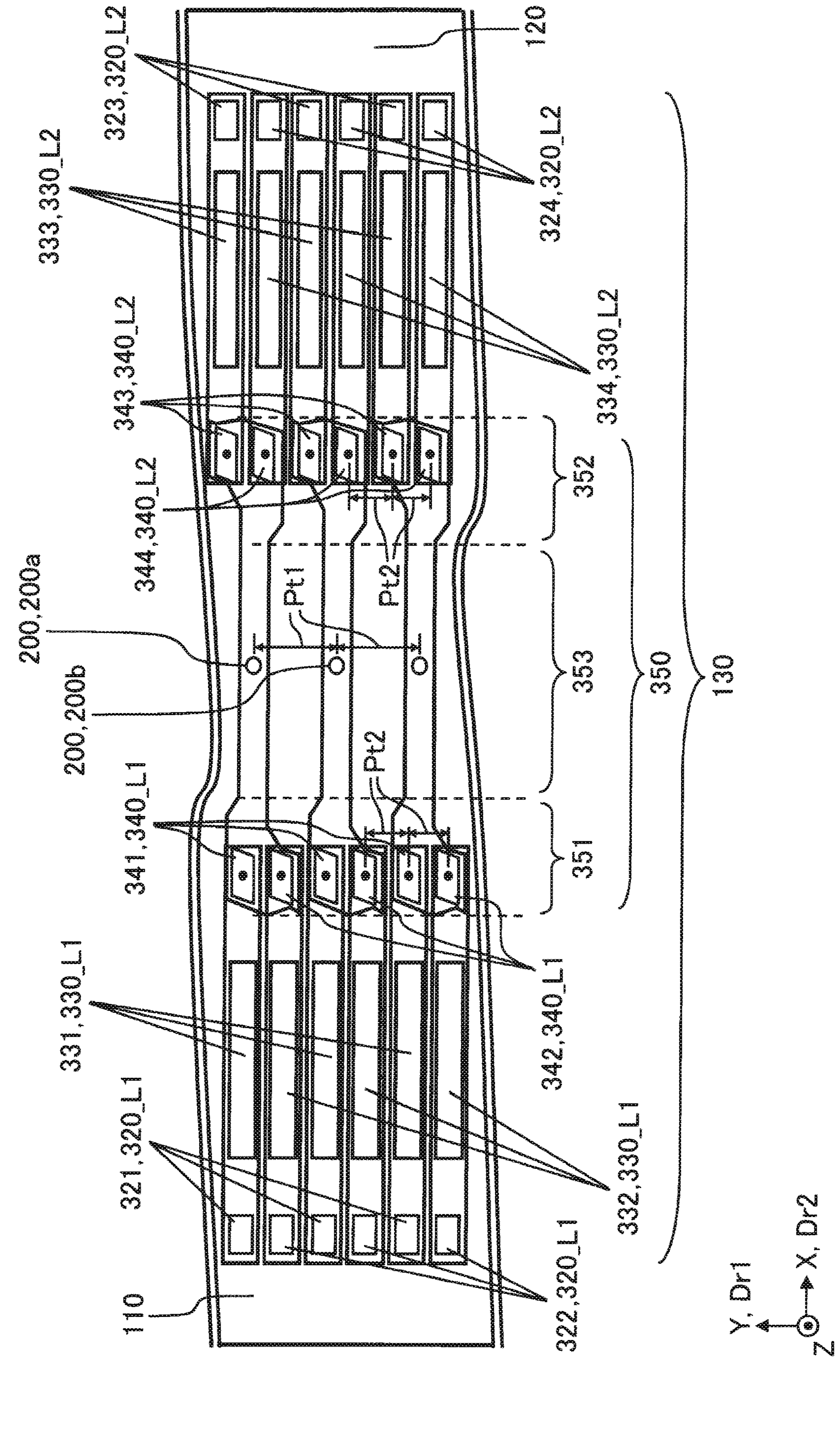
FIG. 4 is a view illustrating a part of flow paths for three nozzles and first and second common liquid chambers, viewed from the bottom of FIG. 3.
Figure 5:
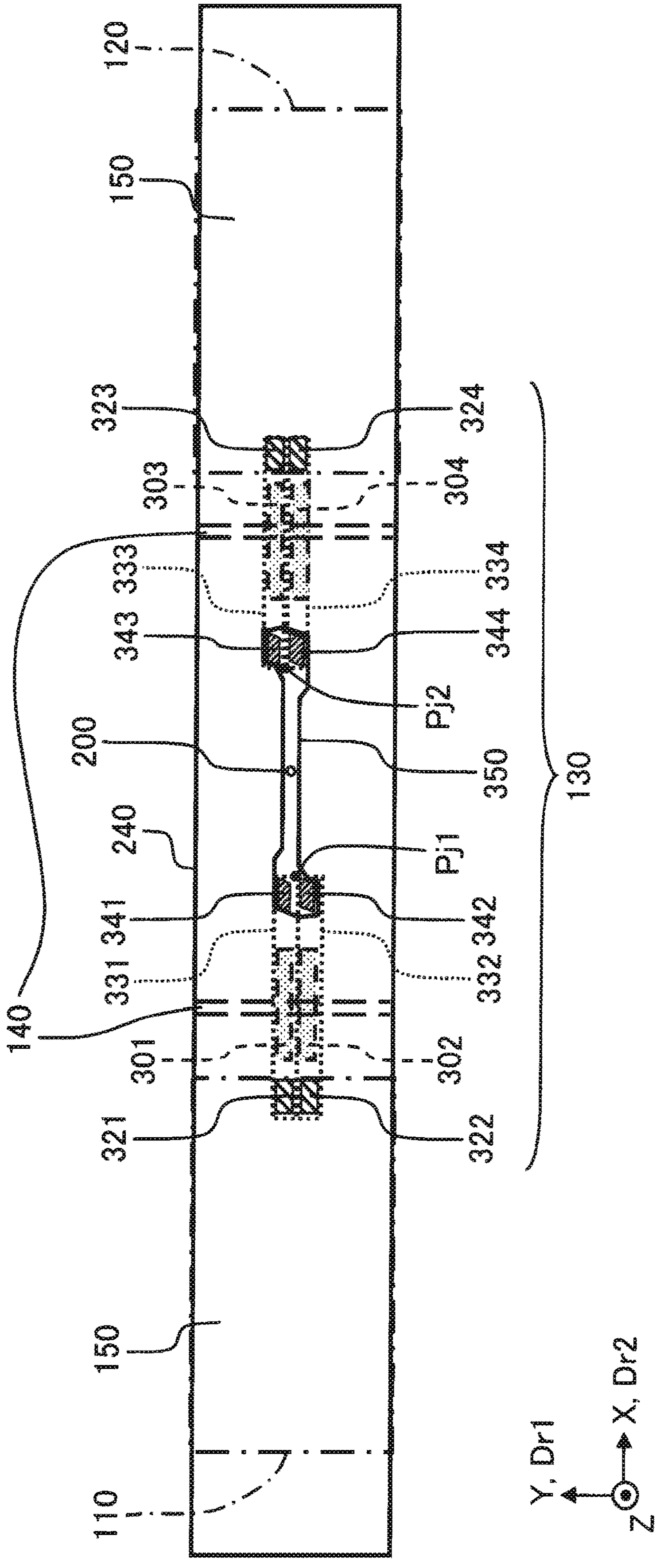
FIG. 5 is a view illustrating a part of a flow path for one nozzle viewed from the bottom of FIG. 3.
Figure 6:
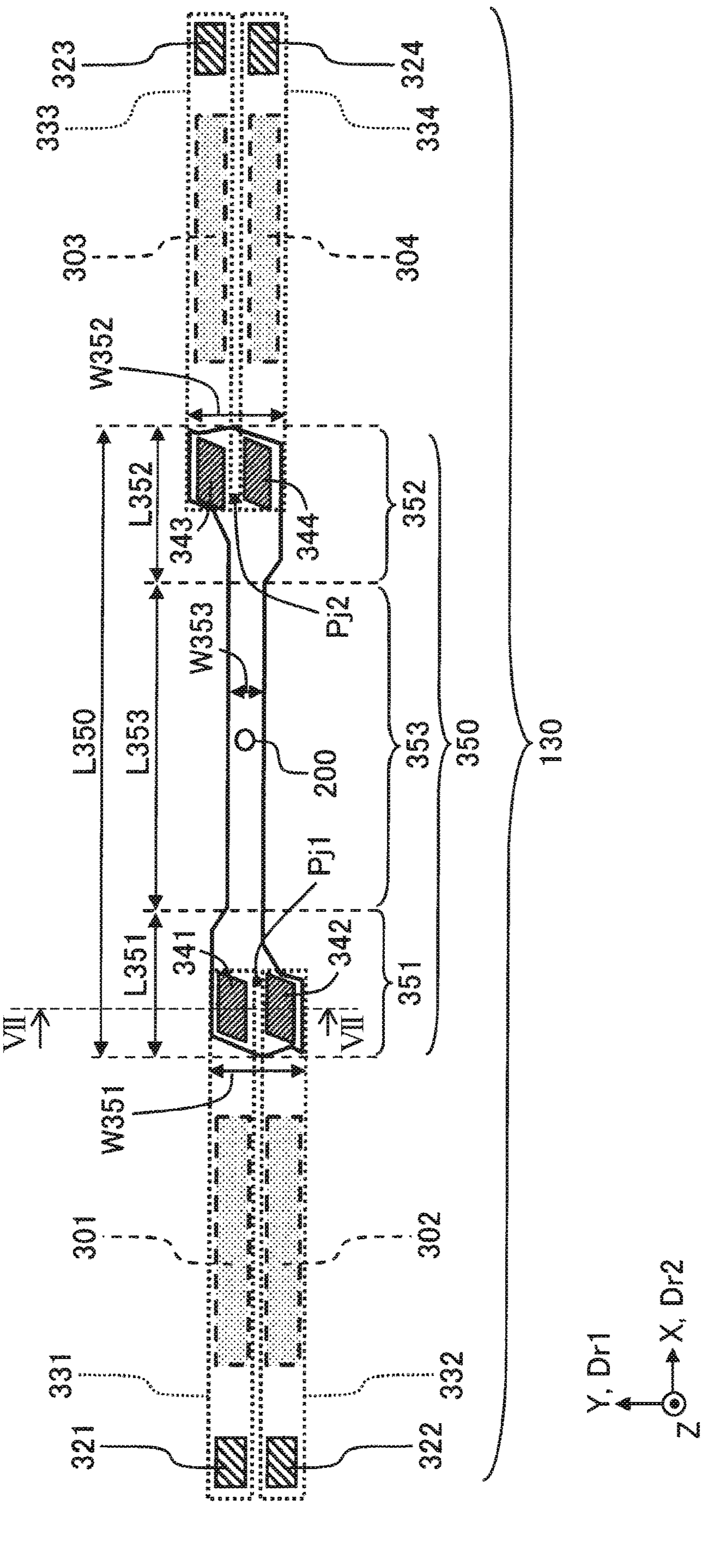
FIG. 6 is an enlarged view of the flow path of FIG. 5.
Figure 7:
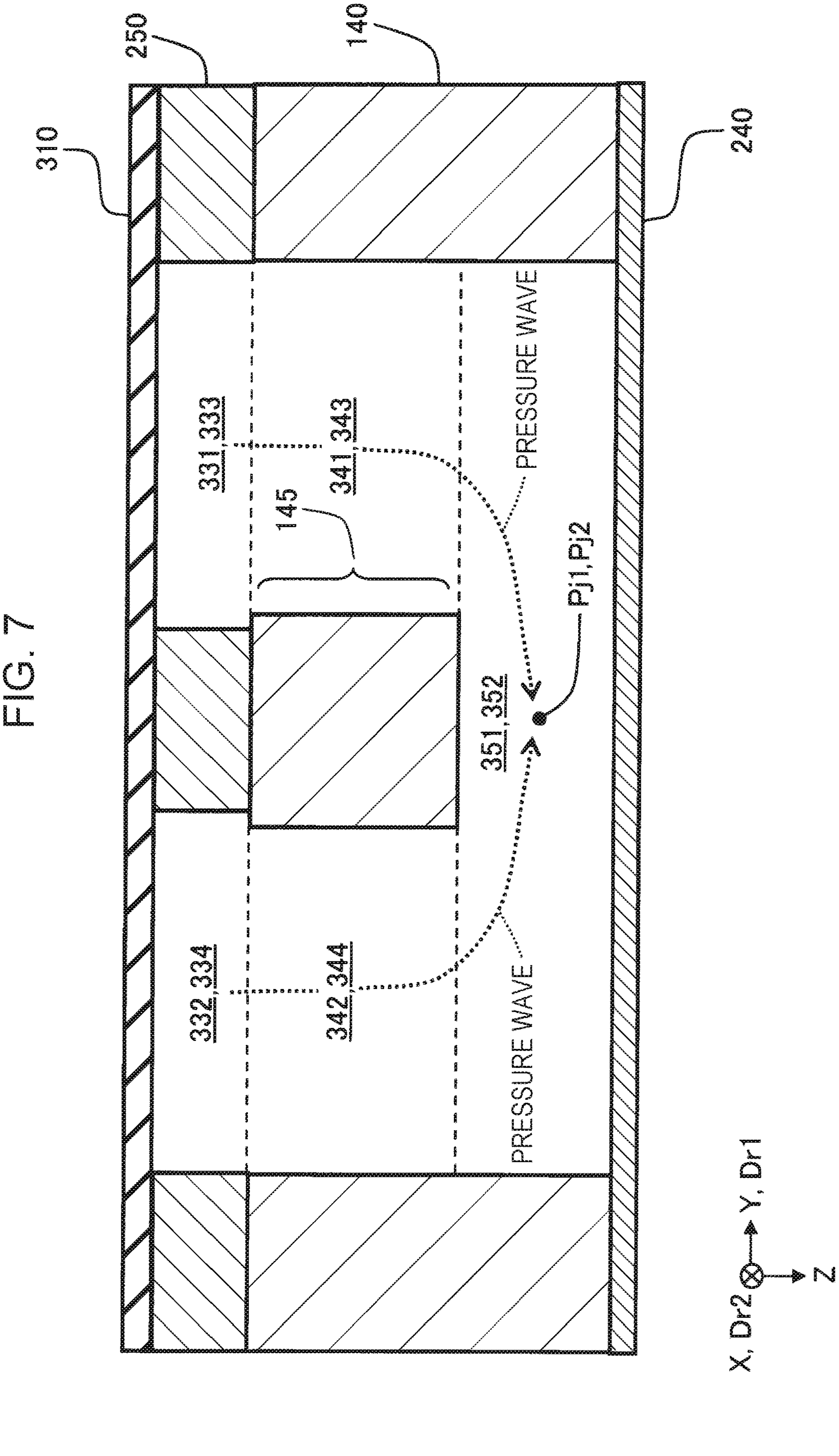
FIG. 7 is a cross-sectional view illustrating a cross section taken along the line VII-VII of FIG. 6.

FIG. 3 is a cross-sectional view taken along the line III-III of FIG. 2. FIG. 4 is a view illustrating a part of flow paths for three nozzles, a first common liquid chamber 110, and a second common liquid chamber 120, viewed from the bottom of FIG. 3. FIG. 5 is a view illustrating a part of a flow path for one nozzle and the common liquid chambers 110 and 120, viewed from the bottom of FIG. 3. FIG. 6 is an enlarged view of the flow path of FIG. 5. FIG. 7 is a cross-sectional view illustrating a cross section taken along the line VII-VII of FIG. 6. Note that FIG. 4 illustrates only the three nozzle-specific flow paths 130, the first common liquid chamber 110, and the second common liquid chamber 120. In addition, in FIGS. 5 and 6, for convenience of illustration, the communication flow path 350 is drawn with solid lines, the pressure chamber 330 is drawn with dotted lines, the driving element 300 is drawn with dashed lines, and the common liquid chambers 110 and 120 are drawn with dot dash lines. Further, in FIG. 7, after the reference numerals of each part in the cross section at the positions of the pressure chambers 331 and 332, the reference numerals of each part in the cross section taken along the line VII-VII of FIG. 6 at positions of other pressure chambers 333 and 334 are shown by commas.

As illustrated in FIG. 4, an interval Pt1 between adjacent nozzles 200, that is, the distance between the centers of the nozzles 200 in the Y direction is constant. Further, an interval Pt2 between adjacent pressure chambers 330_L1 among the plurality of pressure chambers 330_L1 constituting a row L1, that is, the distance between the centers of the pressure chambers 330_L1 in the Y direction is constant. A row L2 has a similar relationship. Furthermore, the interval Pt2 in the row L1 and the interval Pt2 in the row L2 are the same, with the interval Pt2 being half the interval Pt1. In addition, the interval Pt2 between the pressure chambers 330 is the same as the interval between the communication holes 340, and is also the same as the interval between the centers of the nozzles 200 in the Y direction.

As illustrated in FIG. 3, the liquid ejecting head 100 includes a first common liquid chamber 110 to which ink is supplied, a second common liquid chamber 120 to which ink is discharged, and a nozzle-specific flow path 130 that couples the first common liquid chamber 110 and the second common liquid chamber 120. The first common liquid chamber 110 and the second common liquid chamber 120 are provided commonly to the plurality of nozzles 200, and the nozzle-specific flow paths 130 are provided individually for the individual nozzles 200. Each of the common liquid chambers 110 and 120 extends in the Y direction, which is the direction along the nozzle array NL. That is, the longitudinal direction of the common liquid chambers 110 and 120 is parallel to the direction in which the plurality of nozzles 200 are arranged.

The liquid ejecting head 100 has a row L1 of the plurality of pressure chambers 330 communicating with the first common liquid chamber 110, and a row L2 of the plurality of pressure chambers 330 communicating with the second common liquid chamber 120. The row L1 is formed by arranging the plurality of pressure chambers 330 in the Y direction, and the row L2 is formed by arranging the plurality of pressure chambers 330 in the Y direction. The row L1 is arranged on the −X side with respect to the nozzle array NL, and the row L2 is arranged on the +X side with respect to the nozzle array NL. Hereinafter, the plurality of pressure chambers 330 forming the row L1 will be referred to as pressure chambers 330_L1, and the plurality of pressure chambers 330 forming the row L2 will be referred to as pressure chambers 330_L2. Regarding the driving elements 300, the coupling flow paths 320, and the communication holes 340, which will be described later in detail, the driving element 300 corresponding to the row L1 is referred to as a driving element 300_L1, the driving element 300 corresponding to the row L2 is referred to as a driving element 300_L2, a coupling flow path 320 corresponding to the row L1 is referred to as a coupling flow path 320_L1, a coupling flow path 320 corresponding to the row L2 is referred to as a coupling flow path 320_L2, a communication hole 340 corresponding to the row L1 is referred to as a communication hole 340_L1, and a communication hole 340 corresponding to the row L2 is referred to as a communication hole 340_L2.

The nozzle-specific flow paths 130 corresponding to one nozzle 200 in this embodiment include two pressure chambers 330_L1 in the row L1, two pressure chambers 330_L2 in the row L2, two coupling flow paths 320_L1 corresponding to each of the two pressure chambers 330_L1, two coupling flow paths 320_L2 corresponding to each of the two pressure chambers 330_L2, two communication holes 340_L1 corresponding to each of the two pressure chambers 330_L1, two communication holes 340_L2 corresponding to each of the two pressure chambers 330_L2, and the communication flow path 350. Here, the two pressure chambers 330_L1 in the row L1 are referred to as pressure chambers 331 and 332, the two pressure chambers 330_L2 in the row L2 are referred to as pressure chambers 333 and 334, these two coupling flow paths 320_L1 are referred to as coupling flow paths 321 and 322, these two coupling flow paths 320_L2 are referred to as coupling flow paths 323 and 324, these two communication holes 340_L1 are referred to as communication holes 341 and 342, and these two communication holes 340_L2 are referred to as communication holes 343 and 344. In addition, the four driving elements 300 corresponding to each of the pressure chambers 331 to 334 are referred to as driving elements 301 to 304.

Each of the common liquid chambers 110 and 120 can be considered to extend in the Y direction or in the direction in which the adjacent pressure chambers 331 and 332 are arranged, that is, the direction in which the row L1 of the pressure chambers 330 extends in the extending direction. In this embodiment, the direction in which the adjacent pressure chambers 331 and 332 are arranged is an example of the "first direction". In addition, the plurality of nozzle-specific flow paths 130 are arranged in the Y direction along the nozzle array NL.

The lower portions of the common liquid chambers 110 and 120 and the plurality of nozzle-specific flow paths 130 are mainly formed by a communication plate 140. The communication plate 140 may be configured by laminating a plurality of plate-shaped members. A housing section 160 and a pressure chamber substrate 250 are installed on the upper surface of the communication plate 140, that is, the surface of the communication plate 140 facing the −Z side. The pressure chamber substrate 250 is positioned inside the housing section 160 in plan view in the Z direction. A vibrating plate 310 is positioned on the upper surface of the pressure chamber substrate 250, that is, the surface of the pressure chamber substrate 250 facing the −Z side. The plurality of pressure chambers 330 are provided in the pressure chamber substrate 250. Each pressure chamber 330 is a space defined by the communication plate 140, the vibrating plate 310, and the pressure chamber substrate 250. The pressure chamber substrate 250 is manufactured, for example, by processing a silicon single crystal substrate using semiconductor processing technology. As the silicon single crystal substrate, for example, a (110) substrate, that is, a silicon single crystal substrate having a (110) surface as a main surface is preferably used.

The vibrating plate 310 is a plate-shaped member that can elastically vibrate. The vibrating plate 310 is, for example, a laminated body including a first layer made of silicon oxide ($SiO_2$) and a second layer made of zirconium oxide ($ZrO_2$). Further, another layer such as a metal oxide may be interposed between the first layer and the second layer. Further, a part or all of the vibrating plate 310 may be integrally made of the same material as the pressure chamber substrate 250. For example, the vibrating plate 310 and the pressure chamber substrate 250 can be integrally formed by selectively removing a part of the thickness direction of the region corresponding to the pressure chamber 330 in a plate-shaped member having a predetermined thickness by etching or the like. Further, the vibrating plate 310 may be composed of a layer of a single material.

A nozzle plate 240 is installed on the lower surface of the communication plate 140, that is, the surface facing the +Z side of the communication plate 140, and the lower end portions of the first common liquid chamber 110 and the second common liquid chamber 120, that is, the end portions on the +Z side of the first common liquid chamber 110 and the second common liquid chamber 120 are sealed with a flexible sealing film 150 made of a resin film, a thin metal film, or the like.

A wiring substrate 59 is bonded to the surface of the vibrating plate 310 facing the −Z side. The wiring substrate 59 is a mounting component formed with a plurality of wirings for electrically coupling the control unit 450 and the liquid ejecting head 100. The wiring substrate 59 is, for example, a flexible wiring substrate such as a flexible printed circuit (FPC) or a flexible flat cable (FFC). A drive circuit 70 for driving the driving element 300 is mounted on the wiring substrate 59. The drive circuit 70 supplies a driving signal to each driving element 300.

A plurality of driving elements 300 are provided corresponding to each of the pressure chambers 330 on the upper surface of the vibrating plate 310, that is, the surface of the vibrating plate 310 facing the −Z side. These driving elements 300 are composed of piezoelectric elements, for example. The piezoelectric element is composed of, for example, a piezoelectric layer and two electrodes provided to sandwich the piezoelectric layer. For example, when the driving elements 301 to 304, which are piezoelectric elements, vibrate, the vibrations are transmitted to the pressure chambers 331 to 334, respectively, and pressure waves are generated in the pressure chambers 331 to 334, respectively. Ink is ejected from nozzles 200 by the pressure generated by the driving elements 301 to 304. When ink is ejected from the nozzle 200, it is preferable that the four driving elements 301 to 304 corresponding to the nozzle 200 be driven simultaneously in the same phase. As the driving element, a heating element that heats the ink in the pressure chamber 330 may be used instead of the piezoelectric element.

The circulation mechanism 60 is coupled to the common liquid chambers 110 and 120. The circulation mechanism 60 supplies ink to the first common liquid chamber 110 and collects ink discharged from the second common liquid chamber 120 for resupply to the first common liquid chamber 110. The circulation mechanism 60 includes a first supply pump 61, a second supply pump 62, a storage container 63, a collection flow path 64, and a supply flow path 65.

The first supply pump 61 is a pump that supplies the ink stored in the liquid storage section 420 to the storage container 63. The storage container 63 is a sub tank that temporarily stores the ink supplied from the liquid storage section 420. The collection flow path 64 is interposed between the second common liquid chamber 120 and the storage container 63 and is a flow path for collecting the ink from the second common liquid chamber 120 to the storage container 63. The ink stored in the liquid storage section 420 is supplied from the first supply pump 61 to the storage container 63. Further, the ink, which is supplied from the first common liquid chamber 110 to each nozzle-specific flow path 130, but is discharged from each nozzle-specific flow path 130 to the second common liquid chamber 120 without being ejected from the nozzle 200, is supplied to the storage container 63 through the collection flow path 64. The second supply pump 62 is a pump that sends the ink stored in the storage container 63. The supply flow path 65 is interposed between the first common liquid chamber 110 and the storage container 63 and is a flow path for supplying the ink in the storage container 63 to the first common liquid chamber 110.

An opening portion 161 at the upper end of the first common liquid chamber 110, that is, the end portion on the −Z side of the first common liquid chamber 110 is coupled to the supply flow path 65 outside the liquid ejecting head 100. In other words, the opening portion 161 of this embodiment functions as an inlet for introducing the liquid from the circulation mechanism 60. An opening portion 162 at the upper end of the second common liquid chamber 120, that is, the end portion on the −Z side of the second common liquid chamber 120 is coupled to the collection flow path 64 of the circulation mechanism 60 outside the liquid ejecting head 100. In other words, the opening portion 162 of this embodiment functions as an outlet for discharging the liquid to the circulation mechanism 60.

The nozzle-specific flow path 130 has the following flow paths and spaces. In the following description, the term "coupling" is used in the sense of direct coupling. In addition, the term "communication" is used in a broad sense including not only direct coupling but also indirect coupling.

Coupling Flow Paths 321 to 324

The first coupling flow path 321 couples the first common liquid chamber 110 and the first pressure chamber 331.

The second coupling flow path 322 couples the first common liquid chamber 110 and the second pressure chamber 332.

The third coupling flow path 323 couples the second common liquid chamber 120 and the third pressure chamber 333.

The fourth coupling flow path 324 couples the second common liquid chamber 120 and the fourth pressure chamber 334.

All of the coupling flow paths 321 to 324 are flow paths extending in the Z direction and penetrate the communication plate 140. In FIGS. 5 and 6, the coupling flow paths 321 to 324 are hatched for convenience of illustration. A part where the coupling flow path 320 and the pressure chamber 330 intersect can be regarded as a part of the pressure chamber 330.

Pressure Chambers 331 to 334

The first pressure chamber 331 to the fourth pressure chambers 334 are spaces that receive pressure changes by the first driving element 301 to the fourth driving elements 304, respectively. The first pressure chamber 331 and the second pressure chamber 332 are arranged side by side in a first direction Dr1, and the third pressure chamber 333 and the fourth pressure chamber 334 are also arranged side by side in the first direction Dr1. In this embodiment, the first direction Dr1 is parallel to the Y direction. The first pressure chamber 331 and the second pressure chamber 332, and the third pressure chamber 333 and the fourth pressure chamber 334 are arranged to be shifted in a second direction Dr2 orthogonal to the first direction Dr1. In this embodiment, the second direction Dr2 is parallel to the X direction. The pressure waves generated in the first pressure chamber 331 to the fourth pressure chamber 334 reach the nozzle 200 and eject ink from the nozzle 200. The pressure chambers 331 to 334 preferably have the same shape. In this embodiment, a plurality of pressure chambers 331 to 334 are arranged in a zigzag pattern. Each pressure chamber 330 extends in the second direction Dr2.

Communication Holes 341 to 344

The first communication hole 341 to the fourth communication hole 344 are flow paths respectively extending in the Z direction and coupling the communication flow path 350 and each of the first pressure chamber 331 to the fourth pressure chamber 334. That is, each of the pressure chambers 330 has one end coupled to the coupling flow path 320 and the other end coupled to the communication hole 340. The first communication hole 341 to the fourth communication hole 344 are examples of the "first flow path" to the "fourth flow path", respectively. In addition, in FIGS. 5 and 6, the communication holes 341 to 344 are hatched for convenience of illustration. The first communication hole 341 and the second communication hole 342 are arranged side by side in the first direction Dr1, and the third communication hole 343 and the fourth communication hole 344 are also arranged side by side in the first direction Dr1. In FIG. 7, the first communication hole 341 and the second communication hole 342 are partitioned by a communication hole partition wall 145. The communication holes 341 to 344 are flow paths extending in the same direction as the coupling flow paths 321 to 324 and penetrate the communication plate 140. The communication holes 341 to 344 preferably have the same shape. A part where the communication hole 340 and the pressure chamber 330 intersect can be regarded as a part of the pressure chamber 330.

Communication Flow Path 350

As illustrated in FIG. 3, the communication flow path 350 is a flow path that is coupled to the nozzle 200 and communicates between the nozzle 200 and the first pressure chamber 331 to the fourth pressure chamber 334. In addition, the communication flow path 350 is a flow path extending along the nozzle surface of the nozzle plate 240 on which the plurality of nozzles 200 are formed, and the nozzles 200 are provided in the middle of the communication flow path 350. Specifically, the communication flow path 350 extends along the X direction and is defined by the communication plate 140 and the surface of the nozzle plate 240 facing the −Z side. As illustrated in FIG. 6, the communication flow path 350 includes a first part 351, a second part 352, and a third part 353. The first part 351 of the communication flow path 350 is disposed at one end of the communication flow path 350 and coupled to the first communication hole 341 and the second communication hole 342. The second part 352 of the communication flow path 350 is disposed at the other end of the communication flow path 350 and coupled to the third communication hole 343 and the fourth communication hole 344. The third part 353 of the communication flow path 350 is coupled between the first part 351 and the second part 352. Note that the third part 353 is a part narrower than the width of the first part 351 or the second part 352 in the first direction Dr1. Further, in this embodiment, a width W353 of the third part 353 in the first direction Dr1 is constant. A part where the first to fourth communication holes 341 to 344 and the communication flow path 350 intersect can be regarded as a part of the communication flow path 350.

The pressure waves generated in the first pressure chamber 331 and the second pressure chamber 332 are joined at the lower end portions of the first communication hole 341 and the second communication hole 342, that is, a first joining position Pj1 near the end portions on the +Z side of the first communication hole 341 and the second communication hole 342. The pressure waves generated in the third pressure chamber 333 and the fourth pressure chamber 334 are joined at the lower end portions of the third communication hole 343 and the fourth communication hole 344, that is, a second joining position Pj2 near the end portions on the +Z side of the third communication hole 343 and the fourth communication hole 344. These pressure waves act as a driving force for ejecting ink from the nozzles 200.

As the ink, for example, a liquid having pseudoplasticity can be used. More specifically, it is preferable that the ink have a viscosity of 0.01 Pa·s or more and 0.2 Pa·s or less at a shear rate of 1000 $s^{-1}$ at 25° C., and a viscosity of 0.5 Pa·s or more and 50 Pa·s or less at a shear rate of 0.01 $s^{-1}$. In this embodiment, the four pressure chambers 331 to 334 are used to reduce the cross-sectional area of each flow path, increase the flow velocity, and reduce the viscosity of the ink, thereby making it possible to use liquid ink having pseudoplasticity. However, from the pressure chambers 331 to 334 to the nozzle 200, it is desirable to efficiently use the energy of the driving elements 301 to 304, and thus it is not preferable to excessively increase the flow path resistance. Therefore, in this embodiment, as illustrated in FIG. 5, the individual flow paths from the adjacent pressure chambers 330 to the nozzle 200 are joined earlier at the joining positions Pj1 and Pj2 closer to the pressure chamber than to the nozzle 200. Accordingly, the flow path resistance is prevented from becoming excessively large.

In this embodiment, four pressure chambers 331 to 334 are provided for one nozzle 200, but five or more pressure chambers may be provided. In either case, driving elements are provided to correspond to individual pressure chambers.

The nozzle-specific flow path 130 of this embodiment can be considered to include four individual flow paths corresponding to the four driving elements 301 to 304. An "individual flow path" is a flow path including at least the pressure chamber 330, and one individual flow path corresponds to one driving element 300. In this embodiment, the first individual flow path can be considered to include the first coupling flow path 321, the first pressure chamber 331, and the first communication hole 341. The second to fourth individual flow paths can also be grasped in the same manner.

Figure 8:
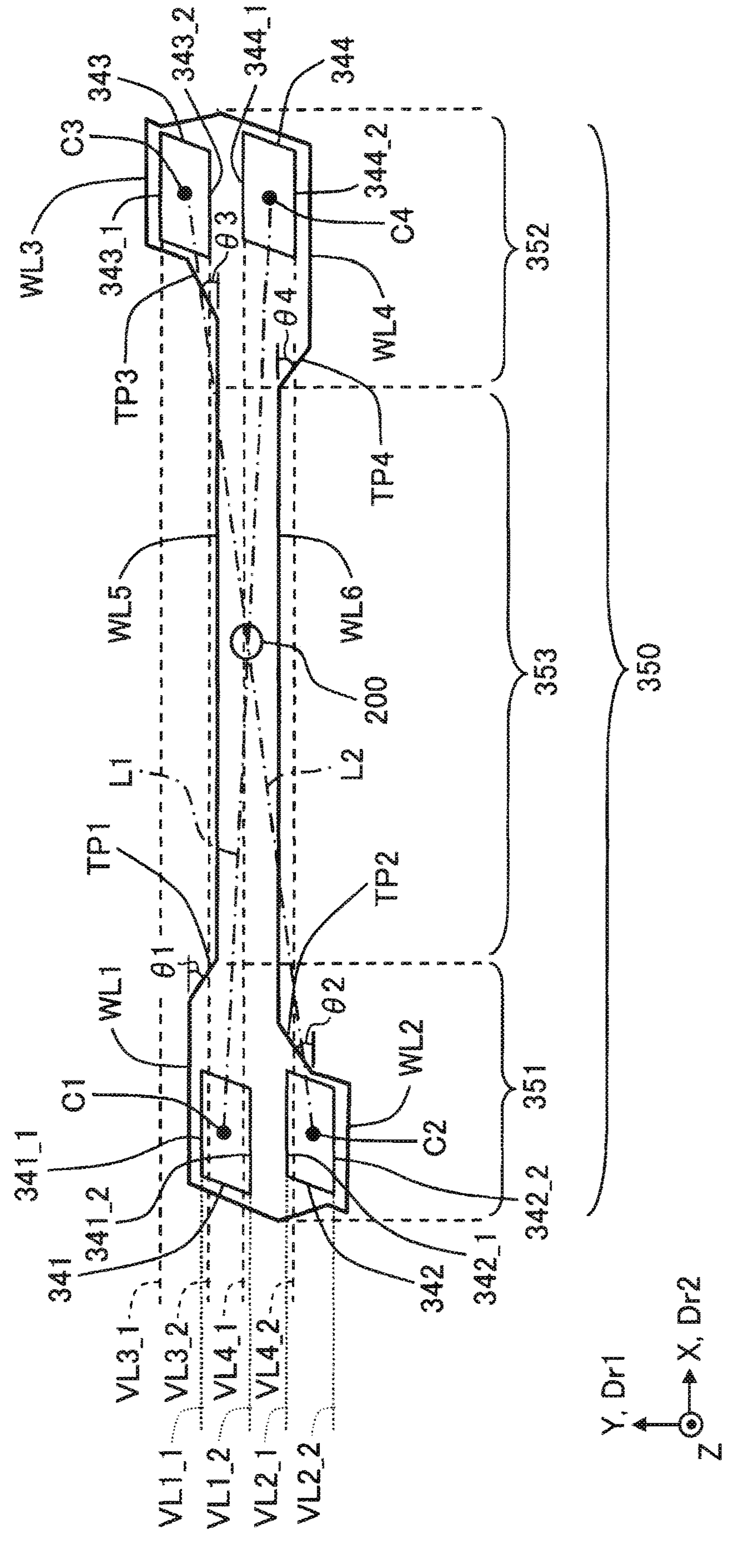
FIG. 8 is a view illustrating a further enlarged communication flow path and communication holes.
Figure 9:
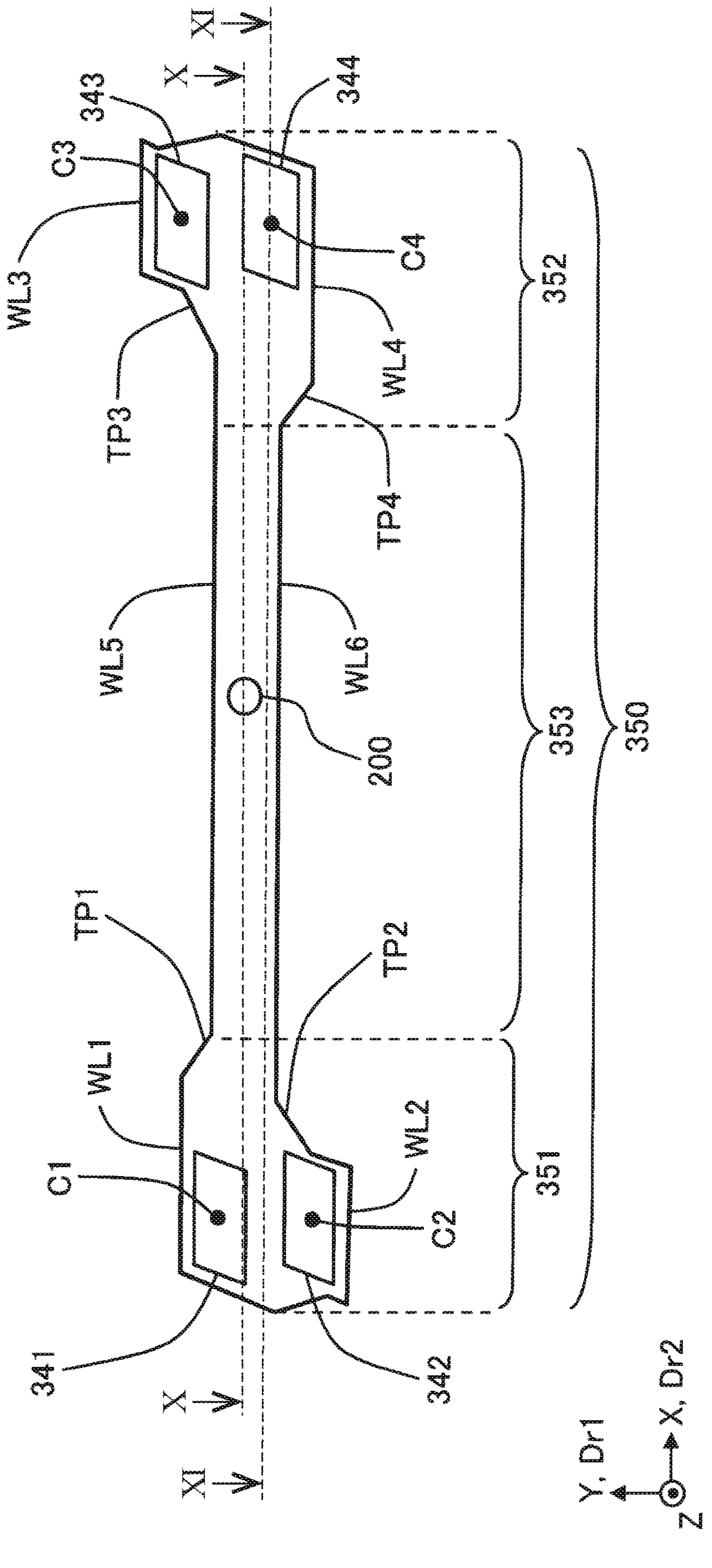
FIG. 9 is a view illustrating a further enlarged communication flow path and communication holes.
Figure 10:
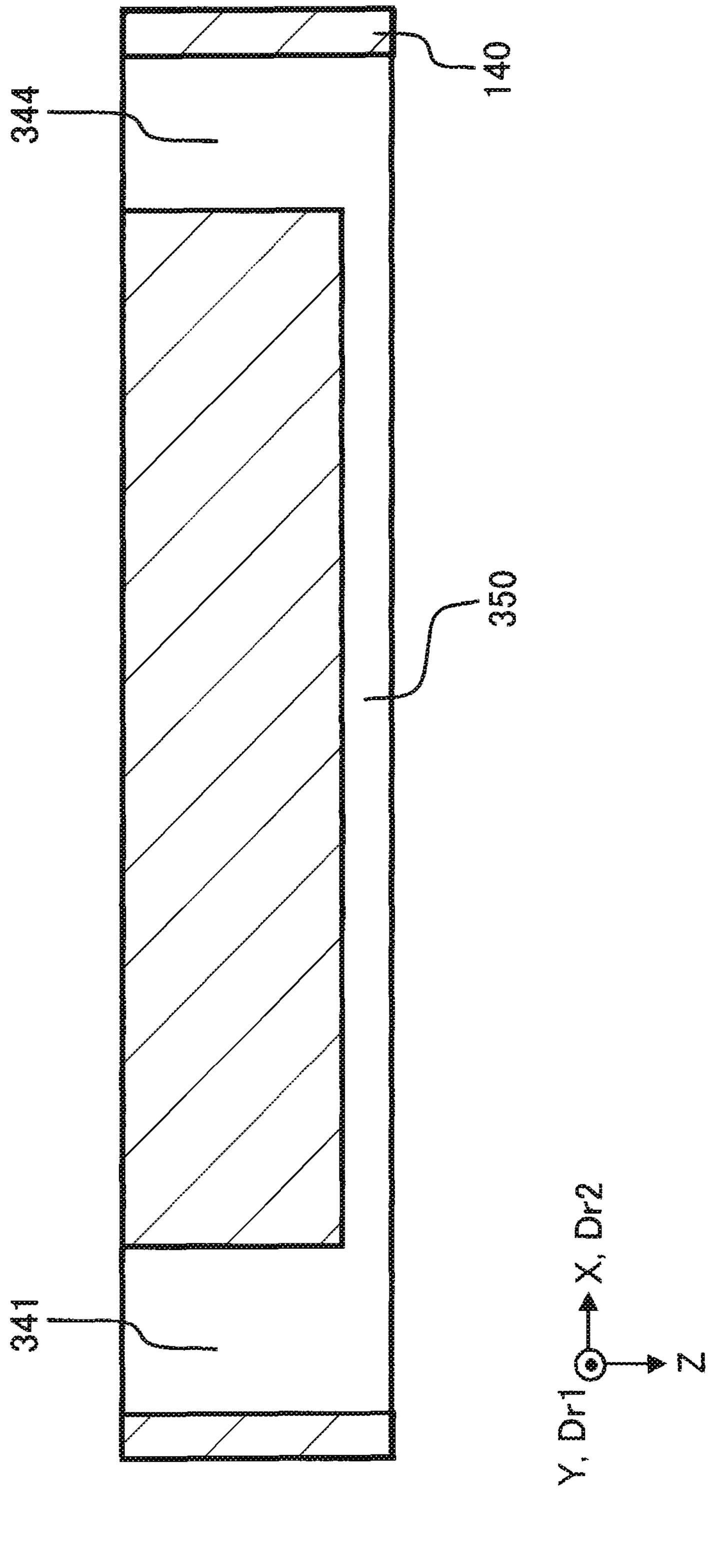
FIG. 10 is a cross-sectional view illustrating a cross section taken along the line X-X of FIG. 9.
Figure 11:
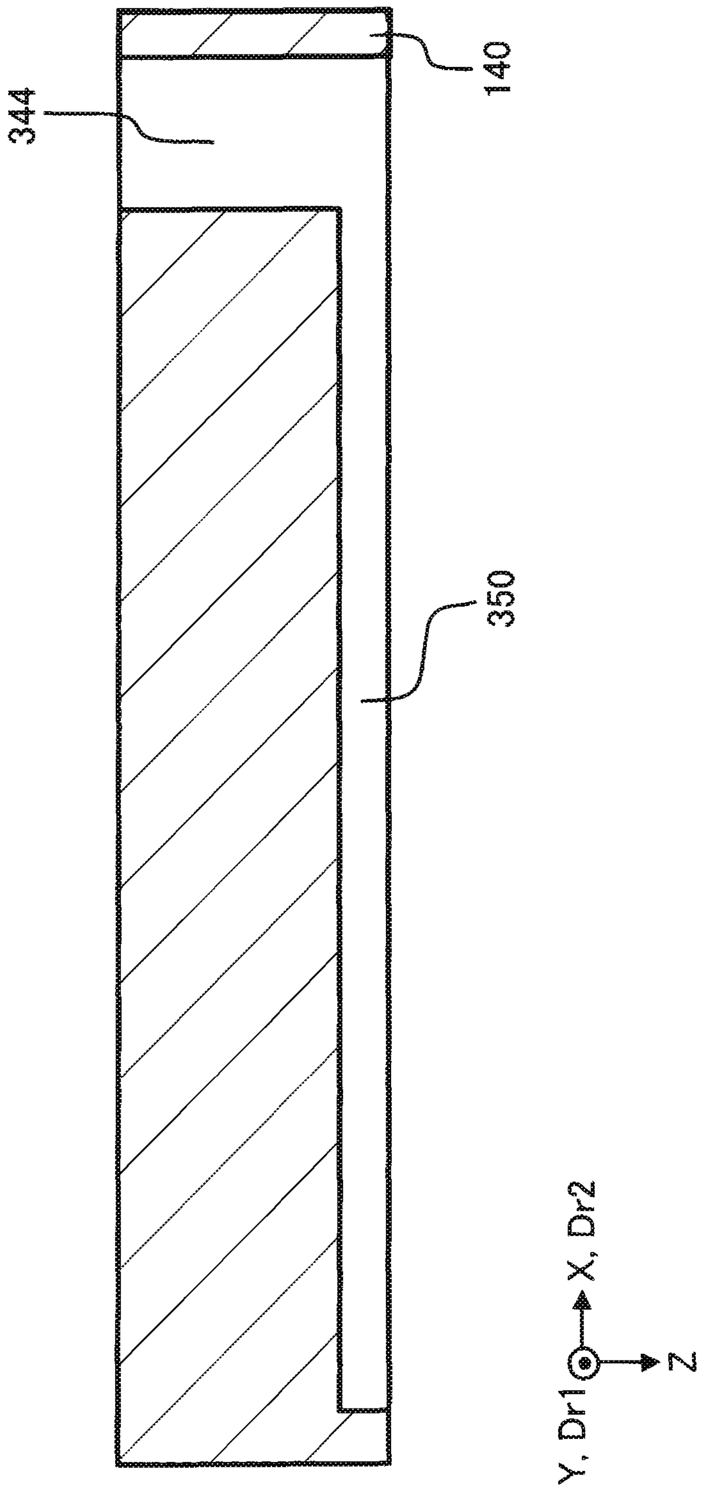
FIG. 11 is a cross-sectional view illustrating a cross section taken along the line XI-XI of FIG. 9.

FIGS. 8 and 9 are views illustrating the further enlarged communication flow path 350 and the communication holes 341 to 344. In FIGS. 8 and 9, hatching of the communication holes 341 to 344 is omitted. FIGS. 8 and 9 are the same except that some reference numerals described in the drawing are different. FIG. 10 is a cross-sectional view illustrating a cross section taken along the line X-X of FIG. 9, in which a part of the communication plate 140 is cut along the X-Z plane. FIG. 11 is a cross-sectional view illustrating a cross section taken along the line XI-XI of FIG. 9, in which a part of the communication plate 140 is cut along the X-Z plane. As described below with reference to FIGS. 8 to 11, the liquid ejecting head 100 of the first embodiment has various features related to the strength, rigidity, and the like of the communication plate 140 as the flow path forming member.

Feature E1

The first communication hole 341 and the second communication hole 342, and the third communication hole 343 and the fourth communication hole 344 are arranged to be shifted in a second direction Dr2 orthogonal to the first direction Dr1. In addition, the first communication hole 341 is shifted from each of the third communication hole 343 and the fourth communication hole 344 in the first direction Dr1, and the second communication hole 342 is shifted from each of the third communication hole 343 and the fourth communication hole 344 in the first direction Dr1. That is, the position of the first communication hole 341 in the second direction Dr2 is shifted from both the position of the third communication hole 343 and the position of the fourth communication hole 344. Here, the meaning that the two communication holes 340 are "shifted" means that the center positions of the two communication holes 340 are different from each other.

The feature E1 means that the four communication holes 341 to 344 are arranged in a zigzag pattern. In general, when the communication plate 140 is provided with a large number of spaces such as the communication holes 341 to 344 and the communication flow path 350, the strength and rigidity of the communication plate 140 are lowered. In particular, in the cross section of the communication plate 140 cut along the X-Z plane, at a position in the first direction Dr1 where both the communication hole 341 and the communication hole 344 are formed in the communication plate 140 as illustrated in FIG. 10, that is, where the communication hole 340_L1 and the communication hole 340_L2 are formed one by one (hereinafter referred to as a fragile position), the strength of the communication plate 140 is low. On the other hand, in the cross section of the communication plate 140 cut along the X-Z plane, at a position in the first direction Dr1 where only one of the communication hole 341 and the communication hole 344 is formed in the communication plate 140 as illustrated in FIG. 11, that is, where only one of the communication hole 340_L1 and the communication hole 340_L2 is formed (hereinafter referred to as a non-fragile position), compared to the fragile position, the strength of the communication plate 140 is high.

Here, an example of the related art in which the communication holes 341 to 344 are not arranged in a zigzag pattern will be considered. In the example of the related art, the positions of each of the communication hole 341 and the communication hole 343 in the first direction Dr1 are the same, and the positions of each of the communication hole 342 and the communication hole 344 in the first direction Dr1 are the same. In other words, the positions of each of the plurality of communication holes 340_L1 in the first direction Dr1 and the positions of each of the plurality of communication holes 340_L2 in the first direction Dr1 are the same. Therefore, when viewed in the second direction Dr2, the communication hole 341 and the communication hole 343 all overlap, and the communication hole 342 and the communication hole 344 all overlap. That is, in the example of the related art, since the above-described fragile positions are continuously formed on the communication plate 140 by the width of the communication hole 340 in the first direction Dr1, the strength of the communication plate 140 as a whole tends to decrease. As a result, in the example of the related art, the bending strength of the communication plate 140 is lowered, and the communication plate 140 may be damaged during assembly. In addition, there is concern about an increase in structural crosstalk due to the reduction in the rigidity of the entire communication plate 140. Furthermore, there is a concern that the amount of deformation due to the influence of linear expansion or the like may increase.

On the other hand, when the four communication holes 341 to 344 are arranged in a zigzag pattern, as illustrated in FIGS. 8 and 9, at the fragile position corresponding to the communication hole 341, a range in which the communication hole 341 and the communication hole 344 overlap when viewed in the second direction Dr2 is provided continuously in the first direction Dr1, and a range in which the communication hole 341 and the communication hole 343 overlap when viewed in the second direction Dr2 is provided continuously in the first direction Dr1. In addition, the non-fragile position corresponding to the communication hole 341 is provided continuously in the first direction Dr1 between the communication hole 343 and the communication hole 344. In other words, the two fragile positions corresponding to the communication hole 341 are separated by the non-fragile position corresponding to the communication hole 341. The same applies to the fragile position and the non-fragile position corresponding to each of the communication holes 342 to 344. Therefore, the range in which the fragile positions are continuously provided in the first direction Dr1 is smaller than the width of the communication hole 340 in the first direction Dr1.

As described above, by arranging the four communication holes 341 to 344 in a zigzag pattern, the fragile positions can be distributed in the first direction Dr1, and thus the range in which the fragile position is provided continuously in the first direction Dr1 can be made smaller than in the example of the related art, and the strength and rigidity of the communication plate 140 can be prevented from excessively decreasing.

When the "communication hole" of the feature E1 described above is replaced with the "pressure chamber", a feature E1*a* that is substantially the same as the feature E1 can be obtained.

Feature E1*a*

The first pressure chamber 331 and the second pressure chamber 332, and the third pressure chamber 333 and the fourth pressure chamber 334 are arranged to be shifted in the second direction Dr2 orthogonal to the first direction Dr1. In addition, the first pressure chamber 331 is shifted from each of the third pressure chamber 333 and the fourth pressure chamber 334 in the first direction Dr1, and the second pressure chamber 332 is shifted from each of the third pressure chamber 333 and the fourth pressure chamber 334 in the first direction Dr1. According to this feature E1*a*, it is also possible to suppress the decrease in the strength and rigidity of the pressure chamber substrate 250 in the same manner as the feature E1 described above.

Feature E2

The first communication hole 341 is arranged between the third communication hole 343 and the fourth communication hole 344 in the first direction Dr1, and the fourth communication hole 344 is disposed between the first communication hole 341 and the second communication hole 342 in the first direction Dr1. That is, in the first direction Dr1, the first communication hole 341 is included in the range covering both the third communication hole 343 and the fourth communication hole 344, and the fourth communication hole 344 is included in the range covering both the first communication hole 341 and the second communication hole 342. In this embodiment, as illustrated in FIG. 8, the first communication hole 341 partially overlaps each of the third communication hole 343 and the fourth communication hole 344 when viewed in the second direction Dr2, specifically on the +X side, and the fourth communication hole 344 partially overlaps each of the first communication hole 341 and the second communication hole 342 when viewed in the second direction Dr2, specifically on the −X side. However, the first communication hole 341 may not overlap the third communication hole 343 and the fourth communication hole 344 at all when viewed in the second direction Dr2, and the fourth communication hole 344 may not overlap the first communication hole 341 and the second communication hole 342 at all. According to this feature E2, it is possible to further suppress the decrease in the strength and rigidity of the communication plate 140. In addition, the communication flow path 350 coupling the communication holes 341 to 344 can be shortened.

Hereinafter, the communication holes 341 to 344 corresponding to one nozzle 200 may be referred to as a communication hole group. The feature E2 is preferably applied not only to one communication hole group corresponding to one nozzle 200, but also to two communication hole groups corresponding to two adjacent nozzles 200. Regarding this point, specific description will be given while, the nozzle 200 positioned at the end portion on the +Y side among the three nozzles 200 illustrated in FIG. 4 is assumed to be a nozzle 200*a*, the nozzle 200 adjacent to the nozzle 200*a* and positioned on the −Y side with respect to the nozzle 200*a* among the three nozzles 200 is assumed to be a nozzle 200*b*, and two communication hole groups corresponding to the nozzles 200*a* and 200*b* are focused. As illustrated in FIG. 4, it is preferable that the second communication hole 342 corresponding to the nozzle 200*a* be disposed between the third communication hole 343 corresponding to the nozzle 200*b* and the fourth communication hole 344 corresponding to the nozzle 200*a* in the first direction Dr1, and the third communication hole 343 corresponding to the nozzle 200*b* be disposed between the first communication hole 341 corresponding to the nozzle 200*b* and the second communication hole 342 corresponding to the nozzle 200*a* in the first direction Dr1.

When the "communication hole" of the feature E2 described above is replaced with the "pressure chamber", a feature E2*a* that is substantially the same as the feature E2 can be obtained.

Feature E2*a*

The first pressure chamber 331 is disposed between the third pressure chamber 333 and the fourth pressure chamber 334 in the first direction Dr1, and the fourth pressure chamber 334 is disposed between the first pressure chamber 331 and the second pressure chamber 332 in the first direction Dr1. That is, in the first direction Dr1, the first pressure chamber 331 is included in the range covering both the third pressure chamber 333 and the fourth pressure chamber 334, and the fourth pressure chamber 334 is included in the range covering both the first pressure chamber 331 and the second pressure chamber 332. In this embodiment, the first pressure chamber 331 partially overlaps each of the third pressure chamber 333 and the fourth pressure chamber 334 when viewed in the second direction Dr2, and the fourth pressure chamber 334 partially overlaps each of the first pressure chamber 331 and the second pressure chamber 332 when viewed in the second direction Dr2. However, the first pressure chamber 331 may not overlap the third pressure chamber 333 and the fourth pressure chamber 334 at all when viewed in the second direction Dr2, and the fourth pressure chamber 334 may not overlap the first pressure chamber 331 and the second pressure chamber 332 at all when viewed in the second direction Dr2. According to this feature E2*a*, it is also possible to further suppress the decrease in the strength and rigidity of the pressure chamber substrate 250 in the same manner as the feature E2 described above.

Feature E3

As illustrated in FIG. 8, a first center C1 of the first communication hole 341 is disposed at the center between a third center C3 of the third communication hole 343 and a fourth center C4 of the fourth communication hole 344 in the first direction Dr1, and the fourth center C4 of the fourth communication hole 344 is disposed at the center between the first center C1 of the first communication hole 341 and the second center C2 of the second communication hole 342 in the first direction Dr1. That is, in the first direction Dr1, the first communication hole 341 is located at the center between the third communication hole 343 and the fourth communication hole 344, and the fourth communication hole 344 is located at the center between the first communication hole 341 and the second communication hole 342. According to this feature E3, it is possible to further suppress the decrease in the strength and rigidity of the communication plate 140. Note that each of the above centers C1 to C4 regarding the feature E3 may be interpreted as each center of the communication holes 341 to 344 in plan view in the Z direction, or may be interpreted as each center of the communication holes 341 to 344 in the first direction Dr1.

The feature E3 is preferably applied not only to one communication hole group corresponding to one nozzle 200, but also to two communication hole groups corresponding to two adjacent nozzles 200. As a specific example, as illustrated in FIG. 4, it is preferable that the second center C2 of the second communication hole 342 corresponding to the nozzle 200*a* be disposed at the center between the third center C3 of the third communication hole 343 corresponding to the nozzle 200*b* and the fourth center C4 of the fourth communication hole 344 corresponding to the nozzle 200*a* in the first direction Dr1, and the third center C3 of the third communication hole 343 corresponding to the nozzle 200*b* be disposed at the center between the first center C1 of the first communication hole 341 corresponding to the nozzle 200*b* and the second center C2 of the second communication hole 342 corresponding to the nozzle 200*a* in the first direction Dr1.

When the "communication hole" of the feature E3 described above is replaced with the "pressure chamber", a feature E3*a* that is substantially the same as the feature E3 can be obtained.

Feature E3*a*

The first center of the first pressure chamber 331 is disposed at the center between the third center of the third pressure chamber 333 and the fourth center of the fourth pressure chamber 334 in the first direction Dr1, and the fourth center of the fourth pressure chamber 334 is disposed at the center between the first center of the first pressure chamber 331 and the second center of the second pressure chamber 332 in the first direction Dr1. That is, in the first direction Dr1, the first pressure chamber 331 is located at the center between the third pressure chamber 333 and the fourth pressure chamber 334, and the fourth pressure chamber 334 is located at the center between the first pressure chamber 331 and the second pressure chamber 332. According to this feature E3*a*, it is also possible to further suppress the decrease in the strength and rigidity of the pressure chamber substrate 250 in the same manner as the feature E3 described above.

Feature E4

The first communication hole 341 overlaps both the third communication hole 343 and the fourth communication hole 344 when viewed in the second direction Dr2, specifically on the +X side, and the fourth communication hole 344 overlaps both the first communication hole 341 and the second communication hole 342 when viewed in the second direction Dr2, specifically on the −X side. Here, "overlapping" means partially overlapping. According to this feature E4, it is possible to further suppress the decrease in the strength and rigidity of the communication plate 140.

Although the first direction Dr1 is the +Y direction in this embodiment, the first direction Dr1 may be the −Y direction. In addition, although the second direction Dr2 is the +X direction, the second direction Dr2 may be the −X direction. Furthermore, the first direction Dr1 and the second direction Dr2 may be set to directions different from these.

The feature E4 is preferably applied not only to one communication hole group corresponding to one nozzle 200, but also to two communication hole groups corresponding to two adjacent nozzles 200. As a specific example, as illustrated in FIG. 4, it is preferable that the second communication hole 342 corresponding to the nozzle 200*a* overlap both the third communication hole 343 corresponding to the nozzle 200*b* and the fourth communication hole 344 corresponding to the nozzle 200*a* when viewed in the second direction Dr2, and the third communication hole 343 corresponding to the nozzle 200*b* overlap both the first communication hole 341 corresponding to the nozzle 200*b* and the second communication hole 342 corresponding to the nozzle 200*a* when viewed in the second direction Dr2.

When the "communication hole" of the feature E4 described above is replaced with the "pressure chamber", a feature E4*a* that is substantially the same as the feature E4 can be obtained.

Feature E4*a*

The first pressure chamber 331 overlaps both the third pressure chamber 333 and the fourth pressure chamber 334 when viewed in the second direction Dr2. According to this feature E4*a*, it is also possible to further suppress the decrease in the strength and rigidity of the pressure chamber substrate 250 in the same manner as the feature E4 described above.

Feature E5

Each of the communication holes 341 to 344 extends in a direction intersecting the extending direction of the communication flow path 350. In this embodiment, the "extending direction of the communication flow path 350" is the X direction, and the extending direction of each of the communication holes 341 to 344 is the Z direction. It is also possible to consider that each of the communication holes 341 to 344 extends in the extending direction of the pressure chambers 331 to 334, which is the direction intersecting the second direction Dr2 in this embodiment. In addition, it is also possible to consider that each of the communication holes 341 to 344 extends in the direction perpendicular to the front surface of the nozzle plate 240. Furthermore, it is also possible to consider that each of the communication holes 341 to 344 extends in the ejection direction Z.

Feature E6

The extending direction of the third part 353 of the communication flow path 350 is parallel to the second direction Dr2. According to this feature E6, the third part 353 does not extend in a direction inclined with respect to the second direction Dr2, and extends in the second direction Dr2 in which the third part 353 is the shortest, and thus the flow path length of the communication flow path 350 can be shortened. As a result, the flow path resistance can be reduced, and the discharge efficiency is improved. Note that the third part 353 is a part narrower than the width of the first part 351 or the second part 352 in the first direction Dr1. Further, as illustrated in FIG. 6, in this embodiment, the width W353 of the third part 353 in the first direction Dr1 is constant.

Feature E7

As illustrated in FIG. 8, side wall surfaces WL5 and WL6 facing each other in the first direction Dr1 exist as side wall surfaces defining the third part 353 of the communication flow path 350. In plan view in the Z direction, each of these side wall surfaces WL5 and WL6 is shifted from the sides of each of the communication holes 341 to 344 extending in the second direction Dr2 with respect to the position in the first direction Dr1. Here, "the sides of each of the communication holes 341 to 344 extending in the second direction Dr2" means a side parallel to the second direction Dr2 among the outer edges of the communication holes 341 to 344 viewed in the Z direction, and two sides exist in each of the communication holes 341 to 344. In this embodiment, the outer edge of the communication hole 340 viewed in the Z direction is a parallelogram, and the sides of the communication hole 340 extending in the second direction Dr2 are the long sides of the parallelogram. Note that the shape of the communication hole 340 in plan view may be a rectangle or a polygon having sides extending in the second direction Dr2, and is not limited to a parallelogram. Note that the shape of the communication hole 340 in plan view may not have a side extending in the second direction Dr2, and may be circular, for example.

Specifically, as the "sides extending in the second direction Dr2 of each of the communication holes 341 to 344", the first communication hole 341 has a side 341_1 on the +Y side and a side 341_2 on the −Y side, the second communication hole 342 has a side 342_1 on +Y side and a side 342_2 on the −Y side, the third communication hole 343 has a side 343_1 on the +Y side and a side 343_2 on the −Y side, and the fourth communication hole 344 has a side 344_1 on the +Y side and a side 344_2 on the −Y side. Although these sides are actually wall surfaces, they can be recognized as "sides" because they are composed of line segments in plan view. In FIG. 8, in order to clearly show the respective positions of sides 341_1, 341_2, 342_1, 342_2, 343_1, 343_2, 344_1, and 344_2 parallel to the second direction Dr2 of the communication holes 341 to 344 in the first direction Dr1, virtual straight lines VL1_1, VL1_2, VL2_1, VL2_2, VL3_1, VL3_2, VL4_1, and VL4_2 extending in the second direction Dr2 from these sides are indicated by dotted lines and dashed lines. Side wall surfaces WL5 and WL6 of the third part 353 are parallel to the second direction Dr2 in plan view.

As can be seen from the virtual straight line, in plan view in the Z direction, each of the side wall surfaces WL5 and WL6 is shifted from the sides of each of the communication holes 341 to 344 extending in the second direction Dr2 with respect to the position in the first direction Dr1. According to this feature E7, compared to a case where the side wall surfaces WL5 and WL6 of the third part 353 parallel to the second direction Dr2 are at the same positions as the sides 341_1, 341_2, 343_1, 343_2, 343_1, 343_2, 344_1, and 344_2 of the communication holes 341 to 344 parallel to the second direction Dr2, the strength and rigidity of the communication plate 140 can be increased.

Feature E8

The first part 351 of the communication flow path 350 has a first side wall surface WL1 and a second side wall surface WL2 that are arranged farthest apart as side wall surfaces that define the first part 351 and face each other in the first direction Dr1. Similarly, the second part 352 has a third side wall surface WL3 and a fourth side wall surface WL4 that are arranged farthest apart as side wall surfaces that define the second part 352 and face each other in the first direction Dr1. Furthermore, the third part 353 has side wall surfaces WL5 and WL6 that define the third part 353 and face each other in the first direction Dr1. The side wall surfaces WL5 and WL6 of the third part 353 are arranged between the first side wall surface WL1 and the second side wall surface WL2 and between the third side wall surface WL3 and the fourth side wall surface WL4. According to this feature E8, it is possible to further suppress the decrease in the strength and rigidity of the communication plate 140. In addition, since the ink flows evenly from the first part 351 and the second part 352 to the nozzle 200, the flow path resistance can be reduced.

Feature E9

The distance from the first communication hole 341 to the nozzle 200 is shorter than the distance from the second communication hole 342 to the nozzle 200, and the distance from the fourth communication hole 344 to the nozzle 200 is shorter than the distance from the third communication hole 343 to the nozzle 200. Further, of the side wall surfaces that define the first part 351 of the communication flow path 350 and face each other in the first direction Dr1, one side wall surface that is closer to the first communication hole 341 than to the second communication hole 342 has a first tapered surface TP1, and the other side wall surface that is closer to the second communication hole 342 than to the first communication hole 341 has a second tapered surface TP2. That is, the distance between the one side wall surface having the first tapered surface TP1 and the first communication hole 341 is shorter than the distance between the one side wall surface having the first tapered surface TP1 and the second communication hole 342, and the distance between the other side wall surface having the second tapered surface TP2 and the second communication hole 342 is shorter than the distance between the other side wall surface having the second tapered surface TP2 and the first communication hole 341.

Similarly, of the side wall surfaces that define the second part 352 of the communication flow path 350 and face each other in the first direction Dr1, one side wall surface that is closer to the third communication hole 343 than to the fourth communication hole 344 has a third tapered surface TP3, and the other side wall surface that is closer to the fourth communication hole 344 than to the third communication hole 343 has a fourth tapered surface TP4. That is, the distance between the one side wall surface having the third tapered surface TP3 and the third communication hole 343 is shorter than the distance between the one side wall surface having the third tapered surface TP3 and the fourth communication hole 344, and the distance between the other side wall surface having the fourth tapered surface TP4 and the fourth communication hole 344 is shorter than the distance between the other side wall surface having the fourth tapered surface TP4 and the third communication hole 343.

At this time, the second tapered surface TP2 is farther from the nozzle 200 than the first tapered surface TP1, and the third tapered surface TP3 is farther from the nozzle 200 than the fourth tapered surface TP4. According to this feature E9, the space of the first communication hole 341 and the second communication hole 342 can be joined earlier, and thus it is possible to reduce the amount of removal of the communication plate 140, and it is also possible to further suppress the decrease in the strength and rigidity of the communication plate 140.

Feature E10

In plan view in the Z direction, the length of the first tapered surface TP1 is smaller than the length of the second tapered surface TP2. In addition, the length of the fourth tapered surface TP4 is shorter than the length of the third tapered surface TP3. According to this feature E10, it is possible to easily obtain a configuration in which the four communication holes 341 to 344 are shifted from each other in the first direction Dr1.

Feature E11

In plan view in the Z direction, the sides 341_1 and 341_2 of the first communication hole 341 extending in the second direction Dr2 are shifted from the sides 343_1 and 343_2 of the third communication hole 343 extending in the second direction Dr2 and the sides 344_1 and 344_2 of the fourth communication hole 344 extending in the second direction Dr2, with respect to the position in the first direction Dr1. Similarly, the sides 342_1 and 342_2 of the second communication hole 342 extending in the second direction Dr2 are shifted from the sides 343_1 and 343_2 of the third communication hole 343 extending in the second direction Dr2 and the sides 344_1 and 344_2 of the fourth communication hole 344 extending in the second direction Dr2, with respect to the position in the first direction Dr1.

As illustrated in FIG. 8, this can be seen that all of the virtual straight lines VL1_1, VL1_2, VL2_1, VL2_2, VL3_1, VL3_2, VL4_1, and VL4_2 are at different positions in the first direction Dr1. According to this feature E11, it is possible to further suppress the decrease in the strength and rigidity of the communication plate 140. In particular, since the communication plate 140 of this embodiment is formed of silicon single crystal, the side of the communication hole 340 in plan view, particularly the long side extending in the second direction Dr2, tends to be a starting point when the communication plate 140 cracks. Therefore, in order to prevent damage to the communication plate 140, each of the sides 341_1, 341_2, 342_1, and 342_2 and each of the sides 343_1, 343_2, 344_1, and 344_2 that are arranged to be shifted in the second direction Dr2 are preferably shifted in the first direction Dr1. In addition, the "extending side" may be replaced with "parallel side" or "parallel wall surface".

The feature E11 is preferably applied not only to one communication hole group corresponding to one nozzle 200, but also to two communication hole groups corresponding to two adjacent nozzles 200. As a specific example, as illustrated in FIG. 4, it is preferable that each of the sides extending in the second direction Dr2 of the first communication hole 341 and the second communication hole 342 corresponding to each of the nozzle 200*a* and the nozzle 200*b*, be shifted from each of the sides extending in the second direction Dr2 of the third communication hole 343 and the fourth communication hole 344 corresponding to each of the nozzle 200*a* and the nozzle 200*b*, in the first direction Dr1.

When the "communication hole" of the feature E11 described above is replaced with the "pressure chamber", a feature E11*a* that is substantially the same as the feature E11 can be obtained.

Feature E11*a*

In plan view, the side of the first pressure chamber 331 extending in the second direction Dr2 is shifted from the side of the third pressure chamber 333 extending in the second direction Dr2 and the side of the fourth pressure chamber 334 extending in the second direction Dr2, with respect to the position in the first direction Dr1. According to this feature E11*a*, it is also possible to further suppress the decrease in the strength and rigidity of the pressure chamber substrate 250 in the same manner as the feature E11 described above.

Feature E12

As illustrated in FIG. 8, in plan view in the Z direction, the nozzle 200 overlaps an intersection of a first line segment L1 coupling the first communication hole 341 and the fourth communication hole 344, and a second line segment L2 coupling the second communication hole 342 and the third communication hole 343. The first line segment L1 is a line segment that couples the center C1 of the first communication hole 341 and the center C4 of the fourth communication hole 344. In addition, the second line segment L2 is a line segment that couples the center C2 of the second communication hole 342 and the center C3 of the third communication hole 343. According to this feature E12, the pressure waves from the four pressure chambers 331 to 334 can reach the nozzle 200 substantially uniformly. Note that the center of the communication hole 340 in the feature E12 may be interpreted as a position that is the center of the communication hole 340 in the first direction Dr1 and the center in the second direction Dr2, or may be interpreted as the geometric center of the communication hole 340.

Feature E13

In plan view, the first line segment L1 entirely overlaps the communication flow path 350, and a part of the second line segment L2 does not overlap the communication flow path 350. According to this feature E13, the pressure waves from the four pressure chambers 331 to 334 can reach the nozzle 200 further uniformly.

Feature E14

An angle θ1 of the first tapered surface TP1 with respect to the second direction Dr2 and an angle θ2 of the second tapered surface TP2 with respect to the second direction Dr2 are respectively equal to an angle θ3 of the third tapered surface TP3 with respect to the second direction Dr2 and an angle θ4 of the fourth tapered surface TP4 with respect to the second direction Dr2. In this embodiment, the angles θ1, θ2, θ3, and θ4 are substantially 35°. When the communication plate 140 is prepared from a silicon single crystal substrate, for example, anisotropic wet etching is used to form the flow paths in the communication plate 140. The wall surfaces of the space formed by the anisotropic wet etching of the silicon single crystal substrate include a wall surface parallel to the first direction Dr1 or the second direction Dr2 in FIG. 8, or a wall surface inclined at a specific angle from these directions Dr1 and Dr2. In this embodiment, the front surface and the rear surface of the silicon single crystal substrate are set to the (110) surface, and anisotropic etching is performed such that the angles θ1, θ2, θ3, and θ4 are 35°±2°. In this manner, a clean tapered surface can be formed by anisotropic wet etching. However, the communication plate 140 may be formed using a material other than silicon single crystal.

Feature E15

It is preferable that each of the first side wall surface WL1 and the second side wall surface WL2, which are side wall surfaces defining the first part 351 and extending in the second direction Dr2, be shifted from the third side wall surface WL3 and the fourth side wall surface WL4, which are side wall surfaces defining the second part 352 and extending in the second direction Dr2, in the first direction Dr1. According to this feature E15, it is possible to further suppress the decrease in the strength and rigidity of the communication plate 140.

The feature E15 is preferably applied not only to one communication hole group corresponding to one nozzle 200, but also to two communication hole groups corresponding to two adjacent nozzles 200. As a specific example, as illustrated in FIG. 4, it is preferable that each of the first side wall surface WL1 and the second side wall surface WL2, which are side wall surfaces defining the first part 351 corresponding to the nozzle 200*a* and extending in the second direction Dr2, be shifted from the third side wall surface WL3 and the fourth side wall surface WL4, which are side wall surfaces defining the second part 352 corresponding to the nozzle 200*b* and extending in the second direction Dr2, in the first direction Dr1.

In the first embodiment, the liquid ejecting head 100 has at least a part of the features E1 to E15 described above, and it is possible to suppress the decrease in strength and rigidity of the communication plate 140. Note that some of the features described above can be omitted.

The liquid ejecting head 100 of the first embodiment further has the following features related to attenuation of pressure waves.

Feature F1

As illustrated in FIG. 6, the first joining position Pj1 is closer to the end portion of the pressure chambers 331 and 332 on the nozzle 200 side than to the nozzle 200 in plan view in the Z direction. That is, the distance from the first joining position Pj1 to each end portion of the pressure chambers 331 and 332 on the nozzle 200 side is shorter than the distance from the first joining position Pj1 to the nozzle 200. Here, the "first end portion of the pressure chamber 331 on the nozzle 200 side" means the end portion opposite to the first common liquid chamber 110, that is, the end portion on the +X side, of both end portions of the pressure chamber 331 in the X direction. The "second end portion of the pressure chamber 332 on the nozzle 200 side" means the end portion opposite to the first common liquid chamber 110, that is, the end portion on the +X side, of both end portions of the pressure chamber 332 in the X direction. Similarly, the second joining position Pj2 is closer to the end portions of the pressure chambers 333 and 334 than to the nozzle 200 in plan view in the Z direction. The "third end portion of the pressure chamber 333 on the nozzle 200 side" means the end portion opposite to the second common liquid chamber 120, that is, the end portion on the −X side, of both end portions of the pressure chamber 333 in the X direction. The "fourth end portion of the pressure chamber 334 on the nozzle 200 side" means the end portion opposite to the second common liquid chamber 120, that is, the end portion on the −X side, of both end portions of the pressure chamber 334 in the X direction.

According to this feature F1, the pressure wave from the first pressure chamber 331 and the pressure wave from the second pressure chamber 332 are combined not in the vicinity of the nozzle 200 but in the vicinity of the pressure chambers 331 and 332. Therefore, compared to the example of the related art in which the pressure wave from the first pressure chamber 331 and the pressure wave from the second pressure chamber 332 are combined in the vicinity of the nozzle 200, excessive attenuation of pressure waves directed from the individual pressure chambers 330 to the nozzles 200 can be prevented. The same applies to the third pressure chamber 333 and the fourth pressure chamber 334 as well.

Moreover, according to the feature F1, compared to the example of the related art, the ratio of the part common to the pressure chambers 331 and 332 in the flow path from each end portion of the pressure chambers 331 and 332 to the nozzle 200 can be increased. Therefore, compared to the example of the related art, the flow path resistance from the pressure chambers 331 and 332 to the nozzle 200 can be reduced. The same applies to the third pressure chamber 333 and the fourth pressure chamber 334 as well. As a result, the pressure loss can be reduced and ejection efficiency can be improved. In particular, when using high-viscosity ink such as pseudoplastic ink, the effect of improving ejection efficiency is remarkable. On the other hand, as in the example of the related art, in the configuration in which the pressure waves join in the vicinity of the nozzle 200, the pressure waves are greatly attenuated and the ejection efficiency is lowered. In addition, there is a concern that it will be difficult to refill the nozzles 200 with ink, or that air bubbles will be caught in the nozzles.

In addition, the first joining position Pj1 can also be considered as the joining position of the flow path from the first pressure chamber 331 to the nozzle 200 and the flow path from the second pressure chamber 332 to the nozzle 200. Similarly, the second joining position Pj2 can also be considered as the joining position of the flow path from the third pressure chamber 333 to the nozzle 200 and the flow path from the fourth pressure chamber 334 to the nozzle 200. As described above, in practice, the liquid is supplied from the outside to the first common liquid chamber 110, and guided from the first common liquid chamber 110 to the first pressure chamber 331 and the second pressure chamber 332. After this, a part of the liquid is ejected from the nozzle 200 in the communication flow path 350, guided to the second common liquid chamber 120 via the third pressure chamber 333 and the fourth pressure chamber 334, and discharged from the second common liquid chamber 120 to the outside. Therefore, both the "flow path from the third pressure chamber 333 to the nozzle 200" and the "flow path from the fourth pressure chamber 334 to the nozzle 200" are assumed to flow in the opposite orientation to the actual liquid flow. However, it can be understood that these flow paths can be assumed regardless of the orientation of the liquid.

Feature F2

As illustrated in FIG. 6, in plan view in the Z direction, the first joining position Pj1 is between the first pressure chamber 331 and the second pressure chamber 332, and the second joining position Pj2 is between the third pressure chamber 333 and the fourth pressure chamber 334.

Feature F3

As illustrated in FIG. 6, the communication flow path 350 has the first joining position Pj1 at one end portion and the second joining position Pj2 at the other end portion. According to this feature F3, the pressure waves from the pressure chambers 331 and 332 join near their sources, the pressure waves from the pressure chambers 333 and 334 join near their sources, and thus attenuation of pressure waves can be suppressed more efficiently.

Feature F4

As illustrated in FIGS. 6 and 7, the first joining position Pj1 is positioned at the first part 351 of the communication flow path 350, and the second joining position Pj2 is positioned at the second part 352 of the communication flow path 350. According to this feature F4, as illustrated in FIG. 7, the communication hole partition walls 145 exist between the communication holes 341 and 342 adjacent to each other and between the communication holes 343 and 344, respectively, and thus crosstalk between the pressure chambers 331 and 332 and crosstalk between the pressure chambers 333 and 334 can be reduced.

Feature F5

As illustrated in FIG. 6, a dimension L353 of the third part 353 of the communication flow path 350 measured in the second direction Dr2 is longer than a dimension L351 of the first part 351. In addition, a dimension L353 of the third part 353 is longer than a dimension L352 of the second part 352.

Feature F6

As illustrated in FIG. 6, the third part 353 of the communication flow path 350 is coupled to the nozzle 200. According to this feature F6, the pressure waves from the pressure chambers 331 to 334 join near their sources, and thus attenuation of pressure waves can be suppressed more efficiently.

Feature F7

As illustrated in FIG. 6, a width W353 of the third part 353 of the communication flow path 350 measured in the first direction Dr1 is smaller than a width W351 of the first part 351. In addition, the width W353 of the third part 353 is smaller than the width W352 of the second part 352. According to this feature F7, when using a liquid having pseudoplasticity, the width W353 of the third part 353 is reduced, and accordingly, it is possible to increase the flow velocity in the vicinity of the nozzle 200 and reduce the viscosity of the ink in the vicinity of the nozzle 200.

Feature F8

As illustrated in FIG. 3, each of the first communication hole 341 to the fourth communication hole 344 extends in a direction intersecting the extending direction of the communication flow path 350. That is, the longitudinal direction of each of the first communication hole 341 to the fourth communication hole 344 is the direction intersecting the longitudinal direction of the communication flow path 350. In this embodiment, the X direction is an example of the "extending direction of the communication flow path 350", and the Z direction is an example of the "direction intersecting the extending direction of the communication flow path 350".

It is also possible to consider that the first communication hole 341 to the fourth communication hole 344 extend in a direction intersecting the direction in which the pressure chambers 330 adjacent to each other are arranged. In addition, as can be seen from FIG. 3, it is also possible to consider that the first communication hole 341 to the fourth communication hole 344 extend in the direction perpendicular to the front surface of the nozzle plate 240. Furthermore, it is also possible to consider that the first communication hole 341 to the fourth communication hole 344 extends in the ejection direction Z.

Feature F9

As illustrated in FIG. 3, each of the communication holes 341 to 344 is closer to the nozzle 200 than is the coupling flow paths 321 to 324 in plan view in the Z direction. In other words, each distance from each of the communication holes 341 to 344 to the coupling flow paths 321 to 324 is shorter than each distance from each of the communication holes 341 to 344 to the nozzle 200. According to this feature F9, the communication flow path 350 can be shortened, and the flow path resistance can be reduced.

As described above, according to the first embodiment, the liquid ejecting head 100 has at least some of the features F1 to F9 described above, and thus the pressure waves can be combined on the pressure chambers 331 to 334 side instead of on the nozzle 200 side, and excessive attenuation of pressure waves directed from the individual pressure chambers 330 to the nozzles 200 can be prevented. Note that some of the features described above can be omitted.

B. Other Embodiments

Figure 12:
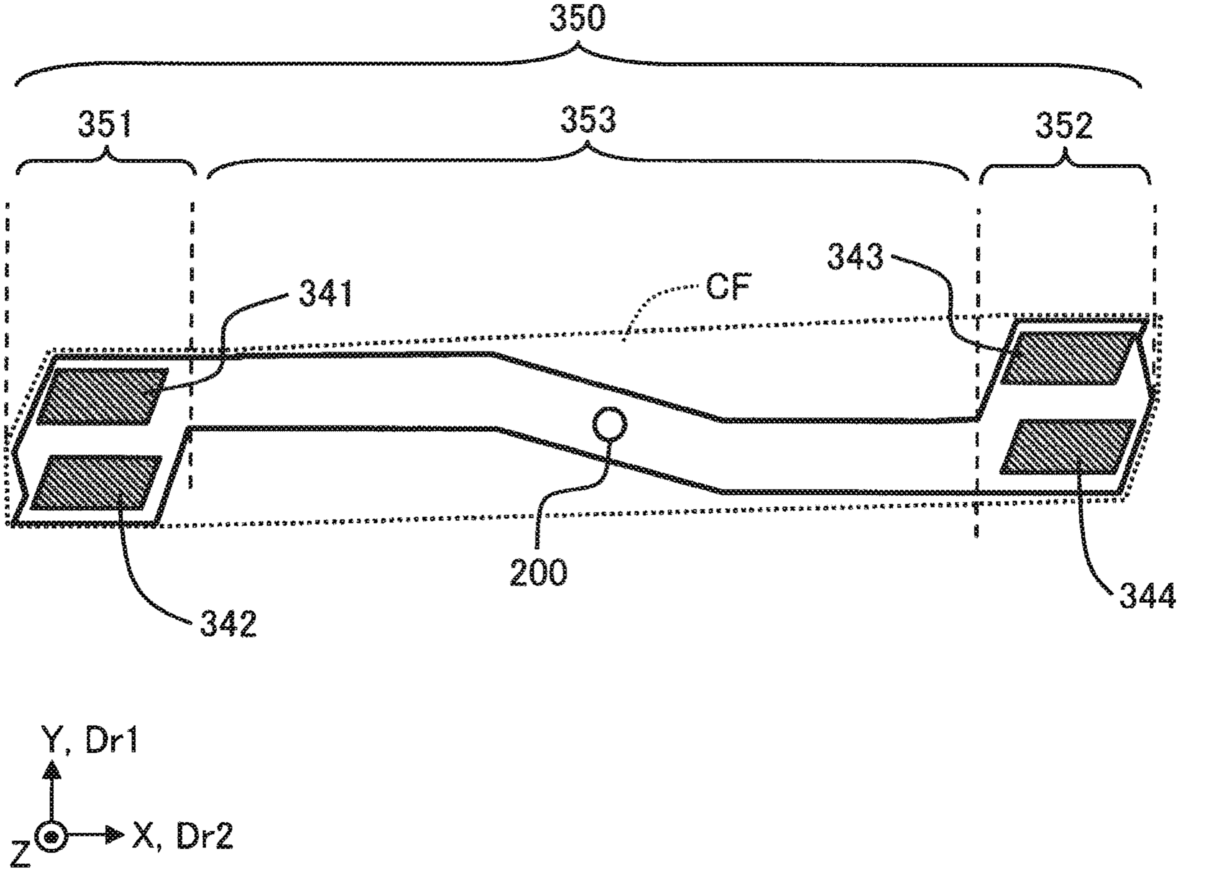
FIG. 12 is a view illustrating a communication flow path in a second embodiment.

FIG. 12 is a view illustrating the shape of the communication flow path 350 in the second embodiment. The main difference from the first embodiment illustrated in FIG. 6 is only the shape of the third part 353 located at the center of the communication flow path 350, and other configurations are substantially the same as those of the first embodiment. That is, in the second embodiment, unlike the first embodiment, the third part 353 is bent in the middle. More specifically, both side portions of the third part 353 are parallel to the second direction Dr2, and the center portion of the third part 353 is inclined with respect to the second direction Dr2. However, even in the second embodiment, the point that the entire communication flow path 350 extends in the second direction Dr2, that is, the point that the longitudinal direction of the entire communication flow path 350 is parallel to the second direction Dr2 is the same as that of the first embodiment. In addition, the plurality of communication holes 341 to 344 and the plurality of pressure chambers are arranged in a zigzag pattern as in the first embodiment. In addition, the third part 353 is preferably inside the smallest circumscribed convex polygon CF that includes the first part 351 and the second part 352. This has the advantage that the communication flow paths 350 of adjacent nozzles do not interfere with each other, and thus there is no need to separate the nozzles from each other.

Figure 13:
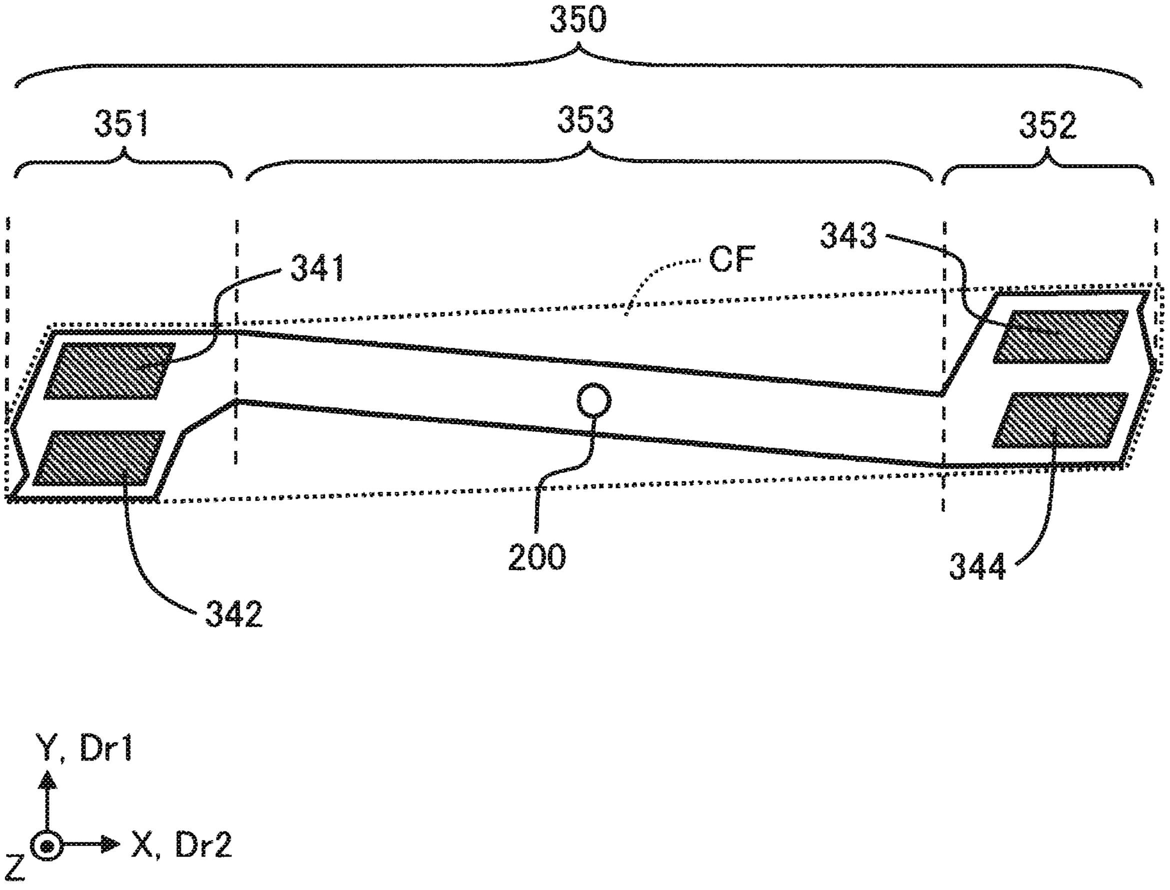
FIG. 13 is a view illustrating a communication flow path in a third embodiment.

FIG. 13 is a view illustrating the shape of the communication flow path 350 in the third embodiment. Even in the third embodiment, the main difference from the first embodiment illustrated in FIG. 6 is only the shape of the third part 353 located at the center of the communication flow path 350, and other configurations are substantially the same as those of the first embodiment. That is, in the third embodiment, the third part 353 is linear as in the first embodiment, but extends in a direction inclined from the second direction Dr2. However, even in the third embodiment, the point that the entire communication flow path 350 extends in the second direction Dr2 is the same as that of the first embodiment. In addition, even in the third embodiment, the third part 353 is inside the smallest circumscribed convex polygon CF that includes the first part 351 and the second part 352.

Figure 14:
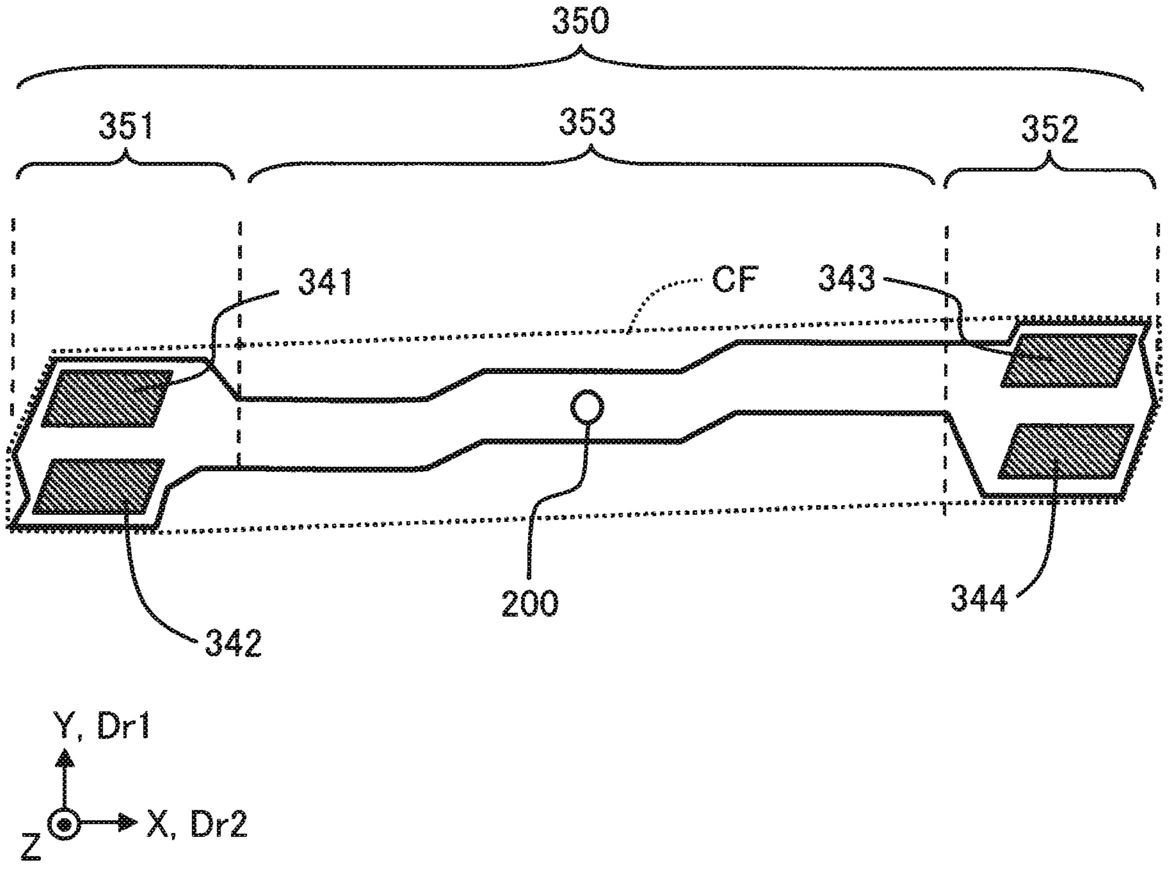
FIG. 14 is a view illustrating a communication flow path in a fourth embodiment.

FIG. 14 is a view illustrating the shape of the communication flow path 350 in the fourth embodiment. Even in the fourth embodiment, the main difference from the first embodiment illustrated in FIG. 6 is only the shape of the third part 353 located at the center of the communication flow path 350, and other configurations are substantially the same as those of the first embodiment. That is, in the fourth embodiment, the third part 353 has a shape in which three parts parallel to the second direction Dr2 are coupled obliquely in sequence. However, even in the fourth embodiment, the point that the entire communication flow path 350 extends in the second direction Dr2 is the same as that of the first embodiment. In addition, even in the fourth embodiment, the third part 353 is inside the smallest circumscribed convex polygon CF that includes the first part 351 and the second part 352. The above-described second to fourth embodiments also have substantially the same effect as the first embodiment.

As described above, the liquid ejecting head 100 of the present disclosure includes at least a part of the above-described features E1 to E14, and accordingly, it is possible to suppress the decrease in the strength and rigidity of the communication plate. In addition, by providing at least a part of the features F1 to F9 described above, excessive attenuation of pressure waves directed from the individual pressure chambers to the nozzles can be prevented.

Modification Example 1

In each of the above-described aspects, the serial type liquid ejecting apparatus 400 that reciprocates the carriage 434 holding the liquid ejecting head 100 is exemplified. However, the present disclosure can also be applied to a line type liquid ejecting apparatus in which the plurality of nozzles 200 are distributed over the entire width of the medium PM. That is, the carriage that holds the liquid ejecting head 100 is not limited to a serial type carriage, and may be a structure that supports the liquid ejecting head 100 in a line type. In this case, for example, the plurality of liquid ejecting heads 100 are arranged side by side in the width direction of the medium PM, and the plurality of liquid ejecting heads 100 are collectively held by one carriage.

Modification Example 2

In each of the above-described aspects, the liquid ejecting apparatus 400 including the circulation mechanism 60 is exemplified. However, the liquid ejecting apparatus 400 may not include the circulation mechanism 60. That is, both the opening portions 161 and 162 of the housing section 160 are inlets for introducing the liquid from the liquid storage section 420, and both the first common liquid chamber 110 and the second common liquid chamber 120 may be used as flow paths for supplying the liquid supplied from the liquid storage section 420 to the nozzle 200.

Modification Example 3

In each of the above-described aspects, four pressure chambers 330 are provided corresponding to one nozzle.

However, four or more pressure chambers 330 may be provided corresponding to one nozzle. For example, effects similar to those of each of the above-described aspects can be obtained as long as, when six pressure chambers 330 are provided corresponding to one nozzle, the first joining position Pj1 of the pressure waves from three of the six pressure chambers 330 is closer to the end portions of the three pressure chambers 330 than to the nozzle 200, and the second joining position Pj2 of the pressure waves from the other three of the six pressure chambers 330 is closer to the end portions of the other three pressure chambers 330 than to the nozzle 200.

Modification Example 4

In each of the above-described aspects, one coupling flow path 320 is coupled to each of the pressure chambers 331 to 334. However, the common coupling flow path 320 may be provided for the pressure chambers 331 and 332 coupled to the same first common liquid chamber 110. In other words, one coupling flow path 320 may be provided corresponding to the plurality of pressure chambers 330. The same applies to pressure chambers 333 and 334 coupled to the same second common liquid chamber 120. When considering four individual flow paths corresponding to the individual pressure chambers 331 to 334 in Modification Example 4, for example, the first individual flow path does not include the coupling flow path 320. The second to fourth individual flow paths can also be grasped in the same manner.

Modification Example 5

In each of the above-described aspects, the coupling flow path 320 is a flow path extending in the Z direction. However, the coupling flow path 320 may be a flow path extending in a direction intersecting the Z direction, and may be a flow path including both a part extending in the Z direction and a part extending in a direction intersecting the Z direction.

Modification Example 6

The liquid ejecting apparatus exemplified in the embodiments can be adopted in various devices such as a facsimile machine and a copier, in addition to a device dedicated to printing. However, the application of the liquid ejecting apparatus is not limited to printing. For example, a liquid ejecting apparatus that ejects a solution of a coloring material is used as a manufacturing device for forming a color filter of a display device such as a liquid crystal display panel. Further, the liquid ejecting apparatus that ejects a solution of a conductive material is used as a manufacturing device for forming wiring or electrodes on the wiring substrate. Further, a liquid ejecting apparatus that ejects a solution of an organic substance related to a living body is used, for example, as a manufacturing device for manufacturing a biochip.

Other Aspects

The present disclosure is not limited to the above-described embodiments and can be implemented with various aspects without departing from the spirit thereof. For example, the present disclosure can also be implemented in the following aspects. For example, the technical features in the embodiments corresponding to the technical features in each aspect described below are to solve some or all of the above-described problems, or in order to achieve some or all of the above-described effects, replacement or combination can be performed as appropriate. Unless the technical features are described as essential in the present specification, deletion is possible as appropriate.

1. According to a first aspect of the present disclosure, there is provided a liquid ejecting head including: a nozzle for ejecting a liquid; first to fourth pressure chambers; a communication flow path coupled to the nozzle and communicating between the nozzle and the first to fourth pressure chambers; a first flow path coupling the communication flow path and the first pressure chamber; a second flow path coupling the communication flow path and the second pressure chamber; a third flow path coupling the communication flow path and the third pressure chamber; a fourth flow path coupling the communication flow path and the fourth pressure chamber; a first driving element that changes a pressure in the first pressure chamber; a second driving element that changes a pressure in the second pressure chamber; a third driving element that changes a pressure in the third pressure chamber; a fourth driving element that changes a pressure in the fourth pressure chamber; a first common liquid chamber communicating with the first pressure chamber and the second pressure chamber; and a second common liquid chamber communicating with the third pressure chamber and the fourth pressure chamber. The first flow path and the second flow path are arranged side by side in a first direction, the third flow path and the fourth flow path are arranged side by side in the first direction, and the first flow path and the second flow path, and the third flow path and the fourth flow path are arranged to be shifted in a second direction orthogonal to the first direction. The first flow path is shifted from each of the third flow path and the fourth flow path in the first direction, and the second flow path is shifted from each of the third flow path and the fourth flow path in the first direction.

According to this liquid ejecting head, compared to a case where the first flow path and the third flow path are at the same position in the first direction, and the second flow path and the fourth flow path are at the same position in the first direction, it is possible to suppress the decrease in the strength and rigidity of the flow path forming member.

2. In the liquid ejecting head, the first flow path may be disposed between the third flow path and the fourth flow path in the first direction, and the fourth flow path may be disposed between the first flow path and the second flow path in the first direction.
3. In the liquid ejecting head, a first center of the first flow path may be disposed at a center between a third center of the third flow path and a fourth center of the fourth flow path in the first direction, and the fourth center may be disposed at a center between the first center and a second center of the second flow path in the first direction.
4. In the liquid ejecting head, the first flow path may overlap both the third flow path and the fourth flow path when viewed in the second direction, and the fourth flow path may overlap both the first flow path and the second flow path when viewed in the second direction.
5. In the liquid ejecting head, each of the first to fourth flow paths may extend in a direction intersecting an extending direction of the communication flow path.
6. In the liquid ejecting head, the communication flow path may include a first part coupled to the first flow path and the second flow path, a second part coupled to the third flow path and the fourth flow path, and a third part coupled to the first part and the second part and coupled to the nozzle, and an extending direction of the third part may be parallel to the second direction.

7. In the liquid ejecting head, each of side wall surfaces defining the third part and facing each other in the first direction may be shifted from sides extending in the second direction of each of the first to fourth flow paths, in the first direction in plan view.

8. In the liquid ejecting head, side wall surfaces defining the first part and facing each other in the first direction may include a first side wall surface and a second side wall surface that are arranged farthest apart, side wall surfaces defining the second part and facing each other in the first direction may include a third side wall surface and a fourth side wall surface that are arranged farthest apart, and side wall surfaces defining the third part and facing each other in the first direction may be disposed between the first side wall surface and the second side wall surface and between the third side wall surface and the fourth side wall surface.

9. In the liquid ejecting head, a distance from the first flow path to the nozzle may be shorter than a distance from the second flow path to the nozzle, of side wall surfaces defining the first part and facing each other in the first direction, one that is closer to the first flow path than to the second flow path may include a first tapered surface and the other that is closer to the second flow path than to the first flow path may include a second tapered surface, and the second tapered surface may be farther from the nozzle than to the first tapered surface.

10. In the liquid ejecting head, in plan view, a length of the first tapered surface may be shorter than a length of the second tapered surface.

11. In the liquid ejecting head, in plan view, a side of the first flow path extending in the second direction may be shifted from a side of the third flow path extending in the second direction and a side of the fourth flow path extending in the second direction, in the first direction.

12. In the liquid ejecting head, in plan view, the nozzle may overlap an intersection of a first line segment coupling the first flow path and the fourth flow path and a second line segment coupling the second flow path and the third flow path.

13. In the liquid ejecting head, in plan view, the first line segment may entirely overlap the communication flow path, and in plan view, a part of the second line segment may not overlap the communication flow path.

14. In the liquid ejecting head, the first common liquid chamber may be a flow path for supplying a liquid to the first pressure chamber and the second pressure chamber, and the second common liquid chamber may be a flow path for collecting a liquid from the third pressure chamber and the fourth pressure chamber.

15. In the liquid ejecting head, the liquid may be ink having pseudoplasticity.

16. In the liquid ejecting head, the pseudoplastic ink may have a viscosity of 0.01 Pa·s or more and 0.2 Pa·s or less at a shear rate of 1000 $s^{-1}$ at 25° C., and a viscosity of 0.5 Pa·s or more and 50 Pa·s or less at a shear rate of 0.01 $s^{-1}$.

17. According to a second aspect of the present disclosure, there is provided a liquid ejecting apparatus including: the liquid ejecting head; and a liquid storage section for storing a liquid supplied to the liquid ejecting head.

The present disclosure can also be implemented in various aspects other than the liquid ejecting head and the liquid ejecting apparatus. For example, the present disclosure can be implemented in the aspect of a method for manufacturing a liquid ejecting head and a liquid ejecting apparatus, a method for controlling the liquid ejecting head and the liquid ejecting apparatus, a computer program for implementing the control method, and a non-temporary recording medium that records the computer program.

What is claimed is:

1. A liquid ejecting head comprising:
a nozzle configured to eject a liquid;
first to fourth pressure chambers;
a communication flow path coupled to the nozzle and communicating between the nozzle and the first to fourth pressure chambers;
a first flow path coupling the communication flow path and the first pressure chamber;
a second flow path coupling the communication flow path and the second pressure chamber;
a third flow path coupling the communication flow path and the third pressure chamber;
a fourth flow path coupling the communication flow path and the fourth pressure chamber;
a first driving element configured to change a pressure in the first pressure chamber;
a second driving element configured to change a pressure in the second pressure chamber;
a third driving element configured to change a pressure in the third pressure chamber;
a fourth driving element configured to change a pressure in the fourth pressure chamber;
a first common liquid chamber communicating with the first pressure chamber and the second pressure chamber; and
a second common liquid chamber communicating with the third pressure chamber and the fourth pressure chamber, wherein
the first flow path and the second flow path are arranged side by side in a first direction,
the third flow path and the fourth flow path are arranged side by side in the first direction,
the first flow path and the second flow path, and the third flow path and the fourth flow path are arranged to be shifted in a second direction orthogonal to the first direction,
the first flow path is shifted from each of the third flow path and the fourth flow path in the first direction, and
the second flow path is shifted from each of the third flow path and the fourth flow path in the first direction.

2. The liquid ejecting head according to claim 1, wherein
the first flow path is disposed between the third flow path and the fourth flow path in the first direction, and
the fourth flow path is disposed between the first flow path and the second flow path in the first direction.

3. The liquid ejecting head according to claim 2, wherein
a first center of the first flow path is disposed at a center between a third center of the third flow path and a fourth center of the fourth flow path in the first direction, and
the fourth center is disposed at a center between the first center and a second center of the second flow path in the first direction.

4. The liquid ejecting head according to claim 2, wherein
the first flow path overlaps both the third flow path and the fourth flow path when viewed in the second direction, and
the fourth flow path overlaps both the first flow path and the second flow path when viewed in the second direction.

5. The liquid ejecting head according to claim 1, wherein each of the first to fourth flow paths extends in a direction intersecting an extending direction of the communication flow path.

6. The liquid ejecting head according to claim 1, wherein the communication flow path includes
a first part coupled to the first flow path and the second flow path,
a second part coupled to the third flow path and the fourth flow path, and
a third part coupled to the first part and the second part and coupled to the nozzle, and
an extending direction of the third part is parallel to the second direction.

7. The liquid ejecting head according to claim 6, wherein each of side wall surfaces defining the third part and facing each other in the first direction is shifted from sides extending in the second direction of each of the first to fourth flow paths, regarding the first direction in plan view.

8. The liquid ejecting head according to claim 6, wherein side wall surfaces defining the first part and facing each other in the first direction include a first side wall surface and a second side wall surface that are arranged farthest apart,
side wall surfaces defining the second part and facing each other in the first direction include a third side wall surface and a fourth side wall surface that are arranged farthest apart, and
side wall surfaces defining the third part and facing each other in the first direction are disposed between the first side wall surface and the second side wall surface and between the third side wall surface and the fourth side wall surface.

9. The liquid ejecting head according to claim 6, wherein a distance from the first flow path to the nozzle is shorter than a distance from the second flow path to the nozzle,
of side wall surfaces defining the first part and facing each other in the first direction, one that is closer to the first flow path than to the second flow path includes a first tapered surface and the other that is closer to the second flow path than to the first flow path includes a second tapered surface, and
the second tapered surface is farther from the nozzle than the first tapered surface.

10. The liquid ejecting head according to claim 9, wherein in plan view, a length of the first tapered surface is shorter than a length of the second tapered surface.

11. The liquid ejecting head according to claim 1, wherein in plan view, a side of the first flow path extending in the second direction is shifted from a side of the third flow path extending in the second direction and a side of the fourth flow path extending in the second direction,
regarding the first direction.

12. The liquid ejecting head according to claim 1, wherein in plan view, the nozzle overlaps an intersection of a first line segment coupling the first flow path and the fourth flow path and a second line segment coupling the second flow path and the third flow path.

13. The liquid ejecting head according to claim 12, wherein
in plan view, the first line segment entirely overlaps the communication flow path, and
in plan view, a part of the second line segment does not overlap the communication flow path.

14. The liquid ejecting head according to claim 1, wherein the first common liquid chamber is a flow path for supplying a liquid to the first pressure chamber and the second pressure chamber, and
the second common liquid chamber is a flow path for collecting a liquid from the third pressure chamber and the fourth pressure chamber.

15. The liquid ejecting head according to claim 1, wherein the liquid is ink having pseudoplasticity.

16. The liquid ejecting head according to claim 15, wherein
the pseudoplastic ink has a viscosity of 0.01 Pa·s or more and 0.2 Pa·s or less at a shear rate of 1000 $s^{-1}$ at 25° C., and a viscosity of 0.5 Pa·s or more and 50 Pa·s or less at a shear rate of 0.01 $s^{-1}$.

17. A liquid ejecting apparatus comprising:
the liquid ejecting head according to claim 1; and
a liquid storage section for storing a liquid supplied to the liquid ejecting head.

* * * * *